US008384512B2

(12) United States Patent
Onoshima et al.

(10) Patent No.: US 8,384,512 B2
(45) Date of Patent: Feb. 26, 2013

(54) DETECTION SENSOR AND SETTING INFORMATION ACQUISITION METHOD THEREOF

(75) Inventors: Yoshiharu Onoshima, Komaki (JP); Takayuki Ochiai, Kasugai (JP)

(73) Assignee: Panasonic Industrial Devices Sunx Co., Ltd., Aichi (JP)

( * ) Notice: Subject to any disclaimer, the term of this patent is extended or adjusted under 35 U.S.C. 154(b) by 1435 days.

(21) Appl. No.: 11/989,321

(22) PCT Filed: Jul. 25, 2006

(86) PCT No.: PCT/JP2006/314697
§ 371 (c)(1),
(2), (4) Date: Jan. 24, 2008

(87) PCT Pub. No.: WO2007/013472
PCT Pub. Date: Feb. 1, 2007

(65) Prior Publication Data
US 2009/0096571 A1    Apr. 16, 2009

(30) Foreign Application Priority Data

Jul. 29, 2005  (JP) ................................ 2005-221182
Oct. 28, 2005  (JP) ................................ 2005-314489

(51) Int. Cl.
*G05B 19/00* (2006.01)
(52) U.S. Cl. ......................... 340/5.1; 340/3.1; 340/13.23
(58) Field of Classification Search .................. None
See application file for complete search history.

(56) References Cited

U.S. PATENT DOCUMENTS

| 5,911,778 | A  | * | 6/1999 | Garnett ........................ 726/21 |
| 6,043,768 | A  |   | 3/2000 | Strasser et al. |
| 6,353,397 | B1 | * | 3/2002 | Bielski et al. ............ 340/870.11 |
| 7,119,572 | B2 | * | 10/2006 | Malik et al. ...................... 326/38 |

FOREIGN PATENT DOCUMENTS

| EP | 0 790 489 | 8/1997 |
| JP | 64-039158 | 2/1989 |
| JP | 02-277143 | 11/1990 |
| JP | 04-334196 | 11/1992 |
| JP | 09-311052 | * 12/1997 |
| JP | 2000-294097 | 10/2000 |
| JP | 2003-346272 | 12/2003 |

OTHER PUBLICATIONS

International Search Report mailed Sep. 12, 2006 for International Application No. PCT/JP2006/314697.

* cited by examiner

*Primary Examiner* — Jennifer Mehmood
*Assistant Examiner* — Brian Wilson
(74) *Attorney, Agent, or Firm* — Wenderoth, Lind & Ponack, L.L.P.

(57) ABSTRACT

A detection sensor and method enable a communication of setting information without a dedicated communication device. In particular, the output of an output signal as well as the reception of the setting information data are conducted using a common external connecting terminal, by selectively enabling a second output circuit, which a pressure sensor essentially includes, and an input circuit commonly connected to the external connecting terminal that is connected to the second output circuit.

18 Claims, 16 Drawing Sheets

DETECTION SENSOR AND SETTING INFORMATION ACQUISITION METHOD THEREOF

BACKROUND OF THE INVENTION

1. Technical Field

The present invention relates to a detection sensor and a setting information acquisition method thereof.

2. Backround Art

Japanese Patent Laid-Open No. 2000-294097 discloses a master unit and a plurality of sensor units have been concatenated with an input/output connector, so that a setting information such as sensitivity setting set by the master unit is transmitted to each sensor unit in order to conduct a setting. This structure enables repetitive setting work for each of the sensor units to be avoided, thereby having advantage to efficiently conduct a setting work.

Other than the above-mentioned structure of Patent Document 1, the setting information also can be transmitted by an optical communication which comprises a light projecting/receiving element for communications. However, these structures include a dedicated communication means provided therein in order to communicate the setting information between the master unit and the sensor unit, and have caused a problem of increased cost.

Thus, there is a need in the art to provide a detection sensor, which enables a communication of setting information without a dedicated communication means, and a setting information acquisition method thereof.

SUMMARY OF THE INVENTION

According to a first aspect of the present invention, there is provided a detection sensor, comprising: a detecting means for detecting a physical value change in a detection area; an outputting means for outputting an output signal based on a detection result of the detecting means; an external connecting terminal, that is electrically connectable to a connecting terminal in an external device, for outputting the output signal from the outputting means to the external device; a setting means for setting a setting information pertaining to a detection action, an inputting means connected to the external connecting terminal; a selecting means for selectively enabling an output action of the outputting means and an input action of the inputting means; and a controlling means for acquiring the present setting information by means of enabling an input action of the inputting means with the selecting means, and setting the setting information in the setting means when an external device for setting information output for outputting said setting information the external device for setting information output is connected to the external connecting terminal and the setting information is output from the present external device for setting information output.

In addition, a "detection sensor" according to the present invention involves, for example, such as a pressure sensor, a photoelectrical sensor, an ultrasonic sensor, a magnetic sensor, and a temperature sensor, under the condition that it detects a physical value change and outputs an output signal based on this detection.

And also, the "output signal" may be a detection signal (an analog signal or a digital signal) corresponding to a physical value change, or a signal according to the comparison result between a detection level and a threshold value.

"Setting information" includes setting values, such as, for example, a threshold value for detection, a response speed, and a timer.

According to a second aspect of the present invention, there is provided a detection sensor, further comprising: a detecting means for detecting a physical value change in a detection area;
an external connecting terminal electrically connectable to a connecting terminal in an external device;
a command inputting means for inputting a command signal from the external connecting device via the external connecting terminal;
a setting means for setting a setting information pertaining to a detection action,
an inputting means connected to the external connecting terminal;
a selecting means for selectively enabling an input action of the command inputting means and an input action of the setting information inputting means; and
a controlling means for acquiring the present setting information by means of enabling an input action of the inputting means with the selecting means, and setting the setting information in the setting means when an external device for setting information output for outputting said setting information 4 is connected to the external connecting terminal and the setting information is output from the present external device for setting information output.

According to the first aspect of the present invention, when acquiring a setting information from an external device for setting information output by means of providing an inputting means commonly connected to an existing external connecting terminal that is continued to an outputting means for outputting an output signal, it is acquired (received) via an external connecting terminal by enabling an input action of the inputting means. Such constitution, in which an output action of an outputting means and an input action of an inputting means are sharing an external connecting terminal, may achieve a cost reduction greater than a conventional constitution provided with a dedicated communication means for the communication of a setting information.

According to the second aspect of the present invention, when acquiring a setting information from an external device for setting information output by means of providing a setting information inputting means commonly connected to an existing external connecting terminal that is continued to a command inputting means for inputting a command signal, it is acquired (received) via an external connecting terminal by enabling an input action of this setting information inputting means. Such constitution, in which an input action of a command inputting means and an input action of a setting information inputting means are sharing an external connecting terminal, may achieve a cost reduction greater than a conventional constitution provided with a dedicated communication means for the communication of a setting information.

DESCRIPTION OF SYMBOLS

10, 40, 50, 60, 70: Pressure sensor (detection sensor)
12: Display member (a first informing means, a second informing means)
13: Mode selector switch (operating means, switching means)
14: Up-down switch (operating means, switching means)
15: Connector
15*d*: External connector
17: Pressure detection unit (detecting means)
18: CPU (controlling means, input detecting means, normal acquisition detecting means, inhibiting means, canceling means)
19: Memory (setting means)
20: A first output circuit (response means)
21: A second output circuit (outputting means)
21*a*, 22*a*, 61*a*, 62*a*: Closing switch (selecting means)
22: Input circuit (inputting means)
23: Operation unit (operating means, switching means, canceling means)
30: Controller (external device)
31*d*: Connecting terminal (connecting terminal of an external device)
41: Analog output circuit (outputting means)
51: Output circuit (outputting means)
52: Controller (external device for setting information output)
61: Command input circuit (command inputting means)
62: Setting information input circuit (setting information inputting means)
Sa: Detection signal (output signal)
Sc: Output signal
D: Setting information data

DETAILED DESCRIPTION OF THE INVENTION

Embodiment 1

As referring now to FIGS. 1 to 6, Embodiment 1 according to the present invention is described.

1. Constitution of External Appearance of a Pressure Sensor

Figure 1:
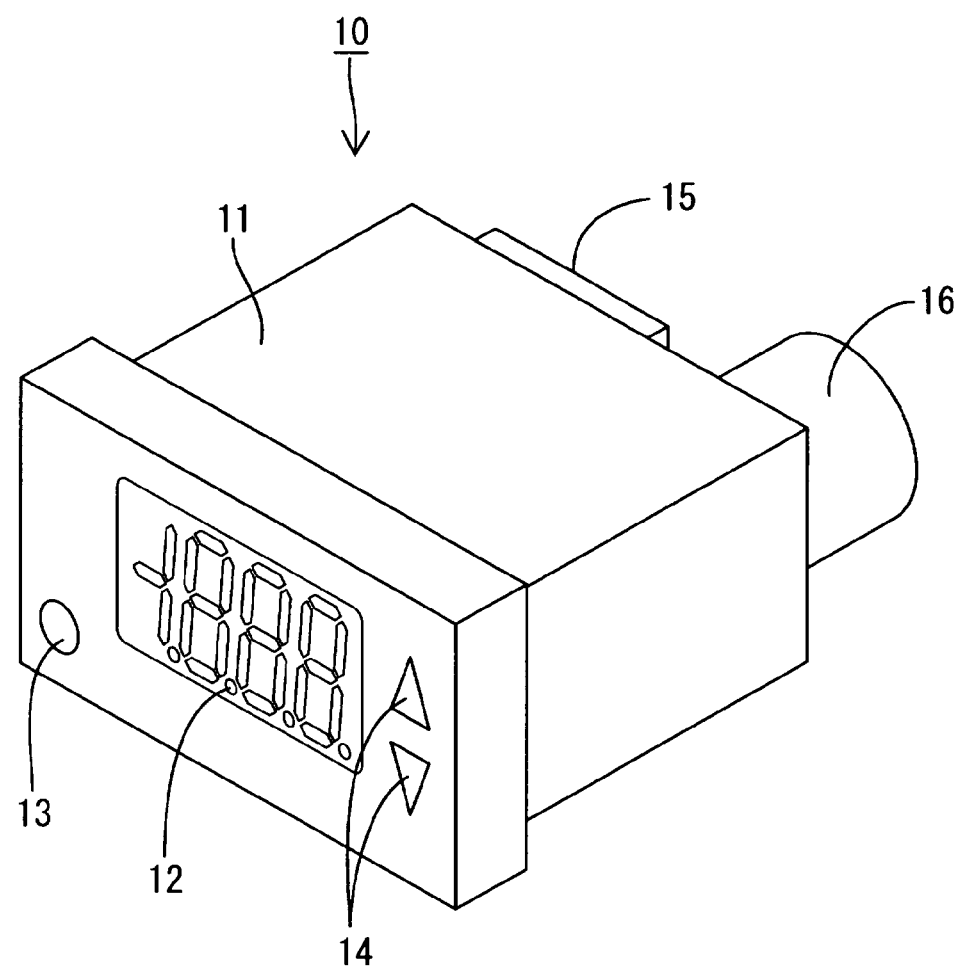
FIG. 1 is a perspective view of a pressure sensor according to Embodiment 1 of the present invention.

A Pressure sensor 10 according to the present embodiment (corresponding to a "detection sensor" in this invention) is used for measuring the vacuum inside of a cavity (corresponding to a "detection area" in this invention) when, for example, forming a vacuum. As illustrated in FIG. 1, the pressure sensor 10 comprises a sensor body 11 of a boxy shape extending back and forth. On the front surface of the sensor body 11 is provided a display member 12 (a "first informing means" and a "second informing means" in the present invention) as a display means for setting information such as a measuring result and a threshold value for detection, a mode selector switch 13 for switching the later-described modes, and an up-down switch 14 for switching a display content on the display member 12.

On the other hand, on the back surface of the sensor body 11, as described later, there are arranged a connector 15 (corresponding to a "connector" in the present invention) for connecting with a controller 30 as an upper device (corresponding to an "external device" in the present invention) or with the other pressure sensor 10, and a pressure introduction port 16 side by side. A tube (not shown) is connected to the pressure introduction port 16 via a joint, so that the inner pressure of a cavity is taken into the inside of the sensor body 11 through the tube as well as the pressure introduction port 16.

2. Electrical Structure of the Pressure Sensor

Figure 2:
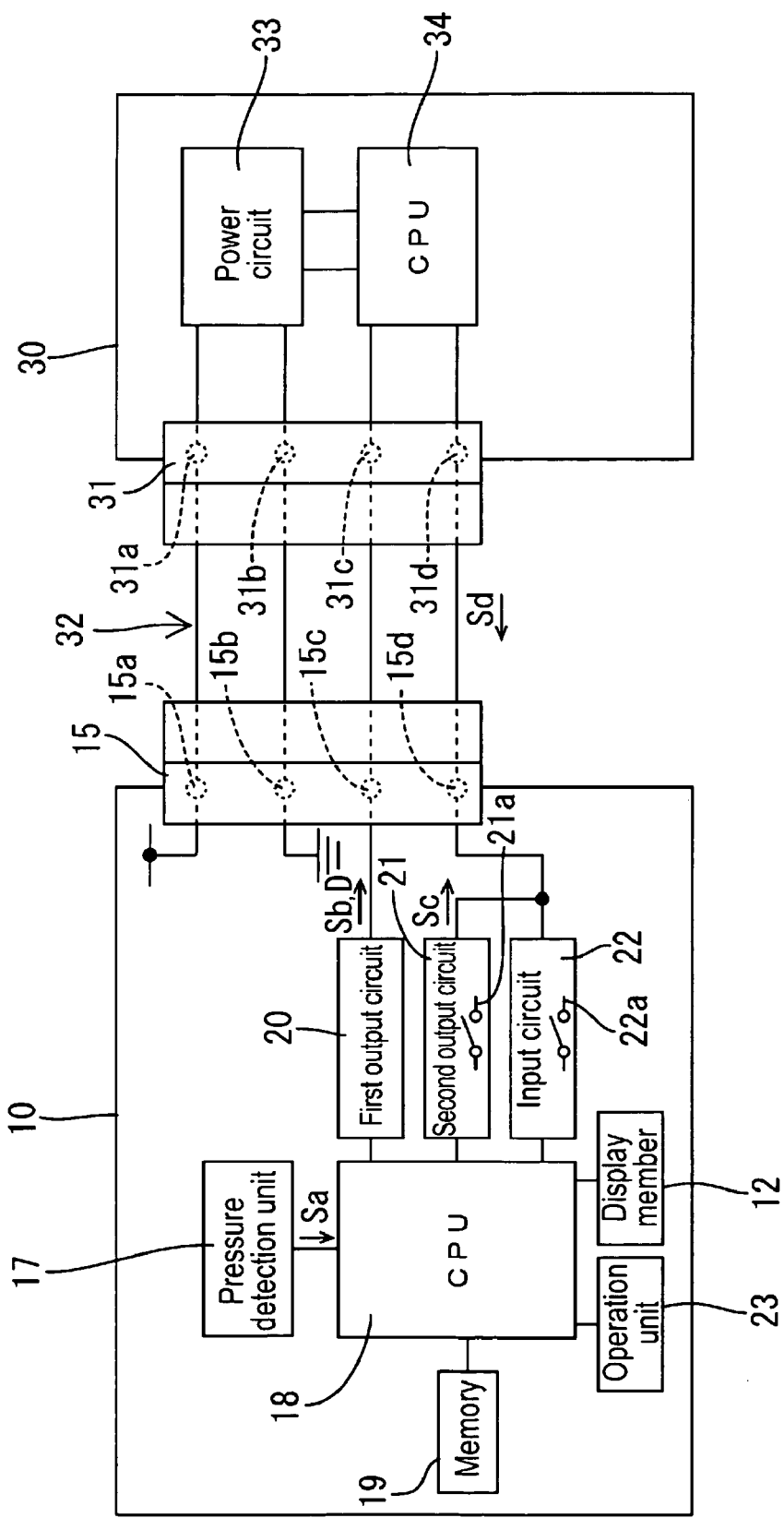
FIG. 2 is a block diagram (a connection status with an external device) illustrating an electrical structure of a pressure sensor.

Next, in reference to FIG. 2, the electrical structure of the pressure sensor 10 is described. FIG. 2 also shows a state in which the pressure sensor 10 is connected to a controller 30.

A symbol 17 in FIG. 2 identifies a pressure detection unit (corresponding to a "detecting means" in this invention), and is comprised of a pressure-sensitive element using a semiconductor diaphragm, and stored in the sensor body 11 together with a CPU 18. In addition, when the inner pressure inside of the cavity is taken in through the pressure introduction port 16, the pressure detection unit 17 outputs a detection signal Sa according to the pressure value thereof as an analogue signal, so that the analog signal is then converted with an A/D converter not shown to be given to the CPU 18.

A memory 19 (corresponding to a "setting means" in this invention) is connected to the CPU 18, and, for example, a first and a second threshold values, a timer value of the execution timing of the detection action, a response speed, and various setting information is recorded therein.

In the later-described detection mode, the CPU 18 repeatedly reads the detection signal Sa at an execution timing according to the timer value set in the memory 19, and compares the detected pressure value with the first and second threshold values set in the memory 19 for detection. Then, an output signal based on the comparison result is output at an output timing according to the response speed set in the memory 19. In particular, an output signal Sb based on a large/small comparison result between a detected pressure value and the first threshold value is output via a first output circuit 20, and an output signal Sc (corresponding to an "output signal" in this invention) based on the large/small comparison result between a detected pressure value and the second threshold value is output via a second output circuit 21 (corresponding to an "outputting means" in this invention).

In addition, the connector 15 is provided with four connecting terminals: two of them are a power terminal 15a and a ground terminal 15b for power supply, and the other two are external connecting terminals 15c and 15d respectively connected to the outputting side of the first output circuit 20 and the second output circuit 21

Moreover, an input circuit 22 (corresponding to an "inputting means" in this invention) is commonly connected to the external connecting terminal 15d (corresponding to an "external connecting terminal" in this invention). The input circuit 22 is originally provided for the purpose of inputting a command signal sent from the controller 30. More particularly, closing switches 21a and 22a (corresponding to a "selecting means" in this invention) are respectively housed in the second output circuit 21 and input circuit 22.

For example, in the later-described detection mode, the CPU 18 then takes closing action of the closing switch 21a of the second output circuit 21 (enabling an output action of the second output circuit 21) at each of the above-mentioned execution timings, while at the same time, takes an opening action of the closing switch 22a of the input circuit 22 (disabling an input action of the input circuit 22), thereby executing a detection action (comparison action between a detected pressure value and a threshold value) and then outputting each of the output signals Sb and Sc. On the other hand, in between each of the execution timings, the CPU 18 distinguishes whether or not the command signal Sd is received on the basis of an electrical potential level of the external connecting terminal 15d, by means of taking an opening action of the closing switch 21 of the second output circuit 21 (disabling an output action of the second output circuit), while taking an closing action of the closing switch 22a of the input circuit 22 (enabling an input action of the input circuit 22). When the command signal Sd is received, the CPU 18 inputs said command signal Sd via the external connecting terminal 15d and the input circuit 22. In this embodiment, the input circuit 22 is also used in the copy mode, which inputs a setting information sent from other pressure sensor 10 as described later.

Additionally, the command signal Sd includes, for example, a zero adjustment command signal, an automatic reference command signal, and an automatic teaching command signal. When the command signal Sd is a zero adjustment command signal, a so-called zero adjustment function is executed, in which a detected pressure value of the moment is recorded as a reference level in the memory 19, and, in the following detection actions, a relative pressure value reducing the above-mentioned reference level from a detected pressure value is displayed on the display member 12.

When the command signal Sd is an automatic reference command signal, a so-called automatic reference function is executed, in which the first threshold value and the second threshold value are shifted and amended for a fluctuating amount of the original pressure of a measuring subject device. When the command signal Sd is an automatic teaching command signal, a so-called automatic teaching function is executed, in which the first threshold value and the second threshold value are reset on the basis of the detected pressure value of the moment.

In addition, the above-mentioned display member 12 and an operating member 23 are connected to the CPU 18. The display member 12 is comprised of, for example, a liquid crystal panel, and displays various modes (such as a detection mode, a copy mode, and a setting information input mode) when mode switching. And also, in the detection mode, a detected pressure value of the present moment as well as the first threshold value and the second threshold value are displayed, and, in the later-described copy mode, such as a letter/symbol indicating whether a setting information is input is displayed.

The operating member 23 sends a signal to the CPU 18 according to the operation by the above-mentioned mode selector switch 13 and the up-down switch 14. Switching the mode selector switch 13 to the "setting information input mode" enables values of each of the presently set setting information to be displayed, and changing the setting information and then taking a deciding action to the desired display values both by operating the up-down switch 14 (for example, simultaneously holding-down the up-down switch 14) allows those display values to be recorded in the memory 19 as setting information. Consequently, the mode selector switch 13, the up-down switch, and the operating member 23 function as an "operating means" according to the present invention.

3. Control Contents of the CPU of a Pressure Sensor (1) Detection Mode

The pressure sensor 10 is connector-connected to the controller 30 as shown in FIG. 2 when conducting a normal detection action. Particularly, a connector 31 is provided also in the controller 30. In the connector 3, four connecting terminals are provided, among which two are a power terminal 31a and a ground terminal 31b that are connected to a power circuit 33 and electrically connected to the power terminal 15a and the ground terminal 15b in the pressure sensor 10 with four connector cables 32. This enables power to be supplied to each pressure sensor 10 from a power circuit 36.

The other two connecting terminals 31c and 31d are continued into a CPU 34, while being also electrically and respectively connected to the external connecting terminals 15c and 15d of the pressure sensor 10 with the connector cable 32. The output signal Sb from the first output circuit of the pressure sensor 10 is input into the connecting terminal 31c, so as to be taken into the CPU 34. The output signal Sc from the second output circuit 21 in the pressure sensor 10 is normally input through the connecting terminal 31d (corresponding to an "external device" in this invention) and taken into the CPU 34, and a command signal Sd is then output by means of an input-output switching circuit not shown when outputting a command.

Figure 4:
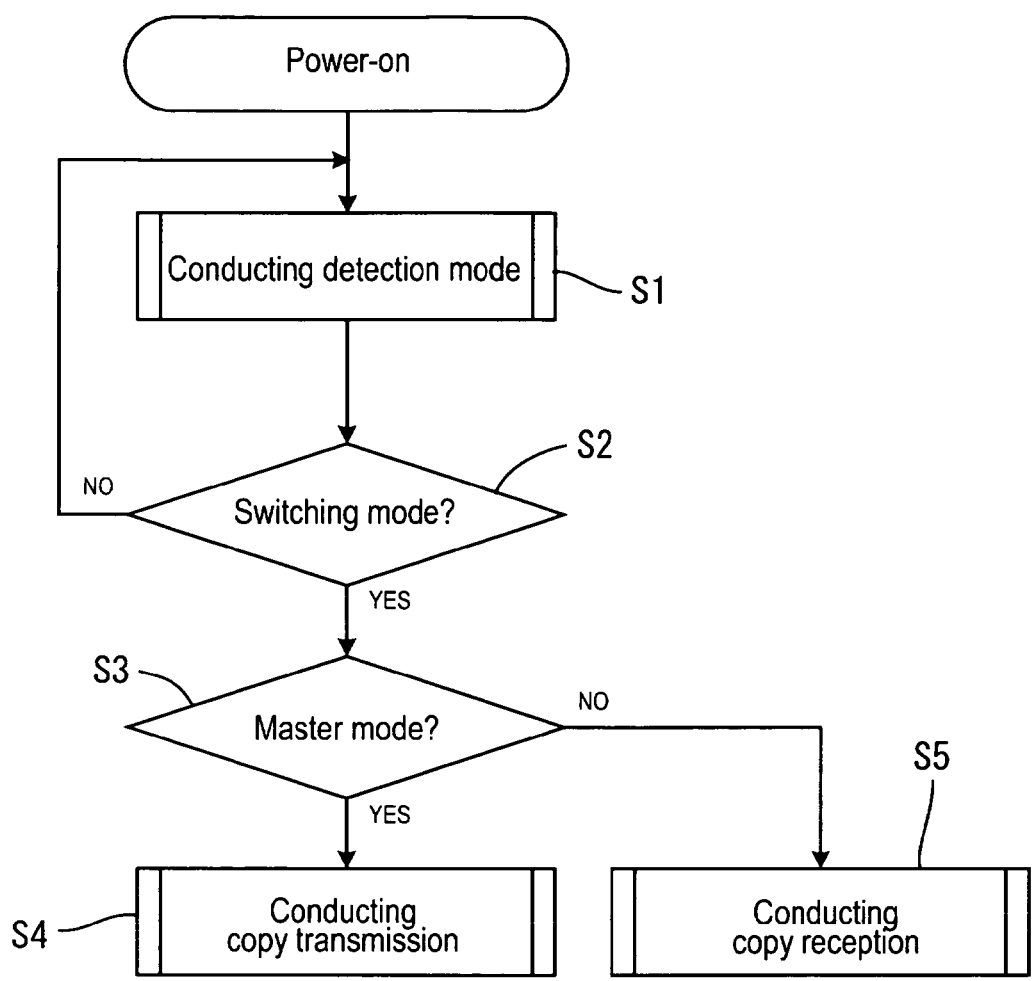
FIG. 4 is a flowchart showing a main routine conducted by a CPU in a pressure sensor.

The CPU then executes a control illustrated in a flowchart in FIG. 4, when the pressure sensor 10 is applied the power-supply by being connector-connected to the controller 30. In the present embodiment, at the time of applying the power-supply, the pressure sensor 10 is in the detection mode, and thereby executing the detection mode which repeats a series of actions such as the above-described detection action (S1). In other words, at each of the execution timings according to a presently set timer value, the detection signal Sa is taken in, and a comparison action between a detected pressure value and the presently set first threshold value and the second threshold value for detection is conducted, and the output signals Sb and Sc based on the comparison result is then output at an output timing according to a presently set response speed by means of enabling the first output circuit 20 and the second output circuit 21. This causes the controller 30 to receive the output signals Sb and Sc at each of the execution timings.

In between this detection action/output action and the next execution timing, it is confirmed whether or not the command signal Sd from the controller 30 is received by means of disabling an output action of the second output circuit 21 while enabling an input action of the input circuit 22, and when being received, the command signal is obtained, thereby executing a function corresponding to the command signal Sd.

(2) Copy mode

Figure 3:
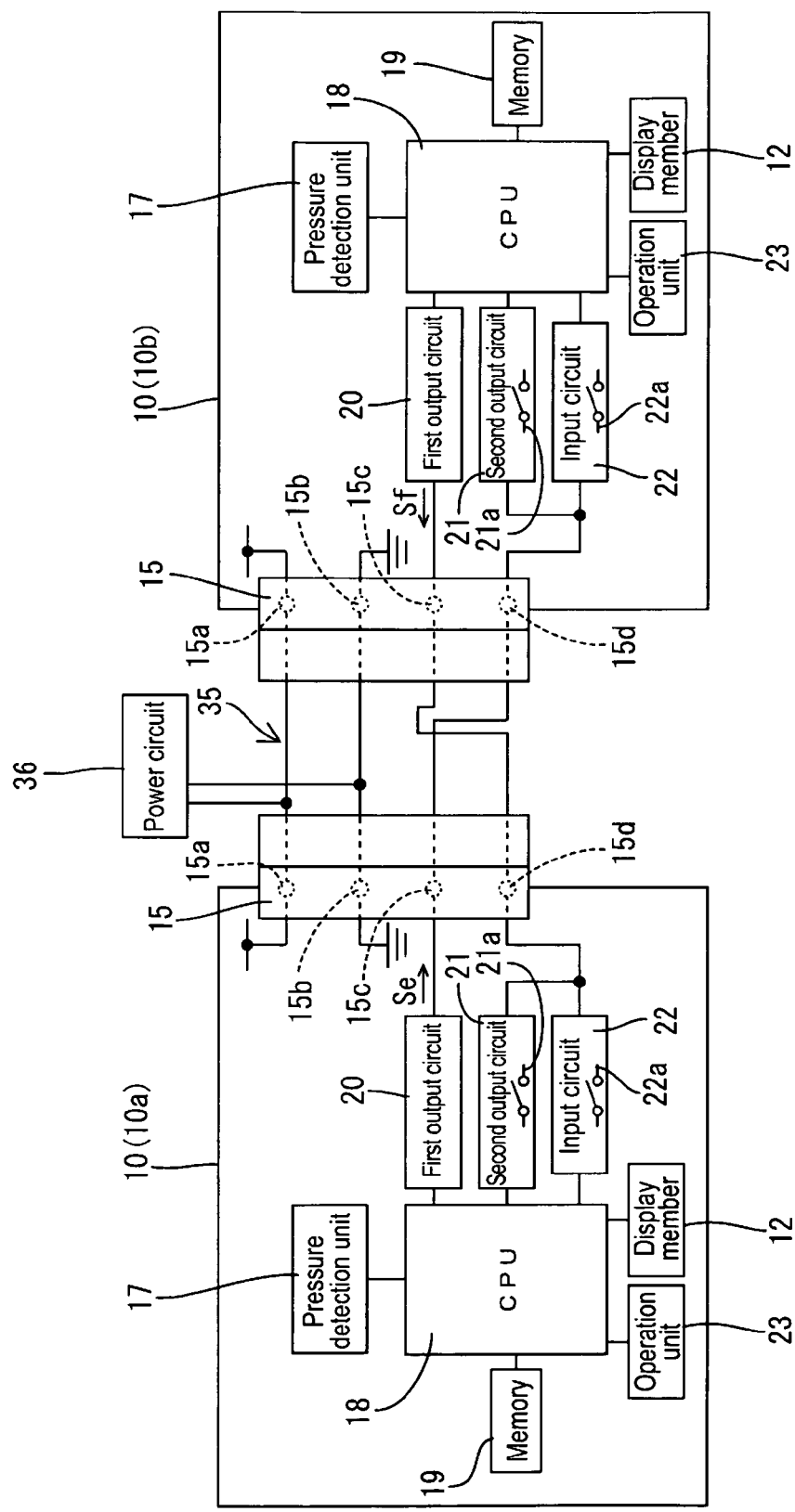
FIG. 3 is a block diagram (a connection status between pressure sensors) illustrating an electrical structure of a pressure sensor.

Here, when the already set setting information is preferred to be obtained into the other pressure sensor 10, as illustrated in FIG. 3, each of the pressure sensors 10 is connector-connected via a connector cable 35. In particular, each of the power terminals 15a and the ground terminals 15b in both of the pressure sensors 10 are electrically connected. And also, the external connecting terminal 15c and the external connecting terminal 15d in one pressure sensor 10 are respectively cross-connected to the external connecting terminal 15d and the external connecting terminal 15c in the other pressure sensor 10.

Here, a pressure sensor 10 according to the present embodiment can be selectively switched from a master mode when preferred to be functioning as a copy source to a slave mode when preferred to be functioning as a copy destination, by means of operations of the above-mentioned mode selector switch 13 and the up-down switch. In the same figure, the pressure sensor 10a in the right is switched to the master mode, and the pressure sensor 10b in the left is switched to the slave mode.

In FIG. 4, in each of the pressure sensors 10, the CPU 18 judges whether or not an interrupt of switching operation to the copy mode is present in between each of the execution timings in S2, and if not ("N" in S2), repeatedly executes the detection mode, while if so ("Y" in S2), cancels the execution of the detection mode, and moves into the copy mode. First, the present mode is judged whether in the master mode or the slave mode in S3. The pressure sensor 10a executes a copy transmission (S4) for having been switched to the master mode ("Y" in S3).

(Master Mode)

Figure 5:
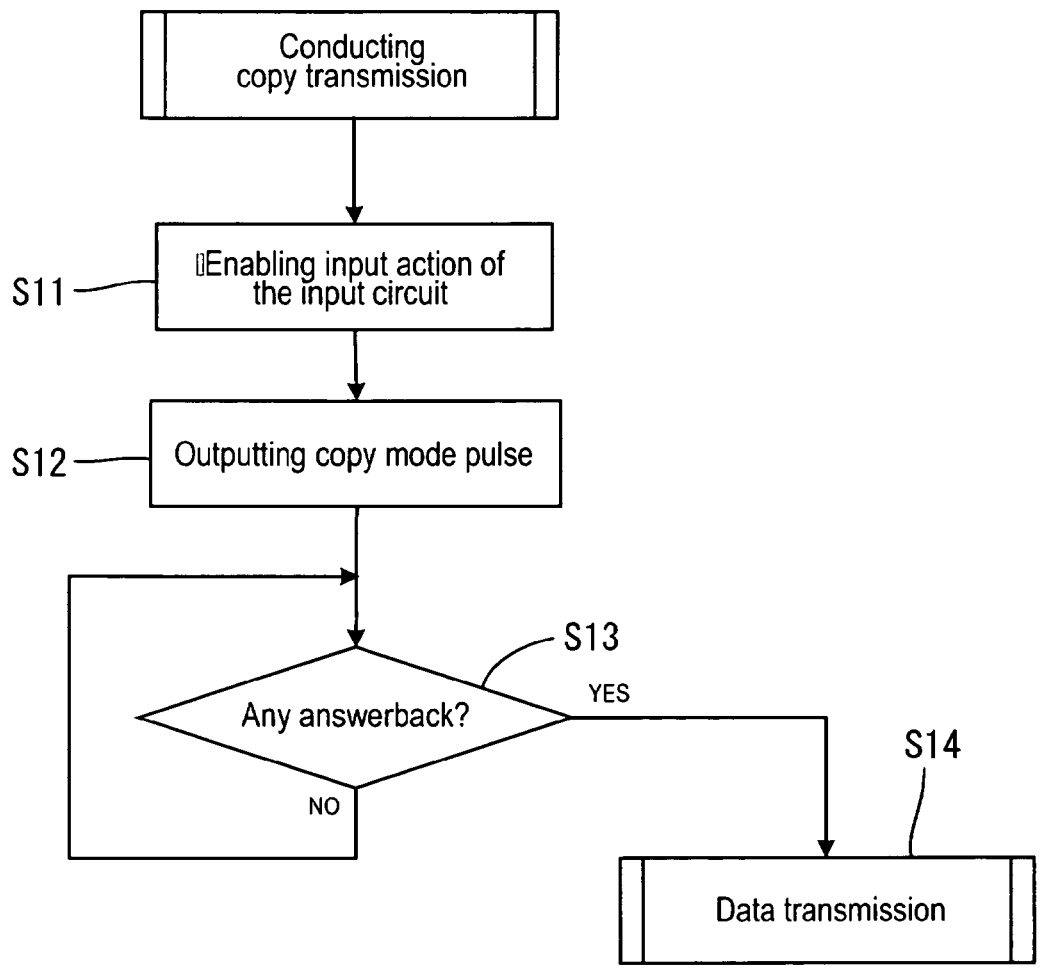
FIG. 5 is a flowchart showing a copy transmission routine executed by a CPU in a pressure sensor.

As illustrated in FIG. 5, the CPU 18 disables an output action of the second output circuit 21, while at the same time, enables an input action of the input circuit 22 in S11. After that, a copy mode pulse Se is output from the first output circuit 20 via the external connecting terminal 15c in S12. This causes the copy mode pulse Se to be given to the external connecting terminal 15b of the pressure sensor 10b in the slave mode.

The CPU then distinguishes whether the later described answerback signal Sf is received via the input circuit 22 which is presently enabled in S13, and waits ready for receiving the answerback signal Sf ("N" in S13), and then, if received ("Y" in S13), the CPU outputs a setting information data D set in the memory 19 via the first output circuit 20 (S14). This causes the setting information data D to be given to the external connecting terminal 15d of the pressure sensor 10b in the slave mode.

(Slave Mode)

Figure 6:
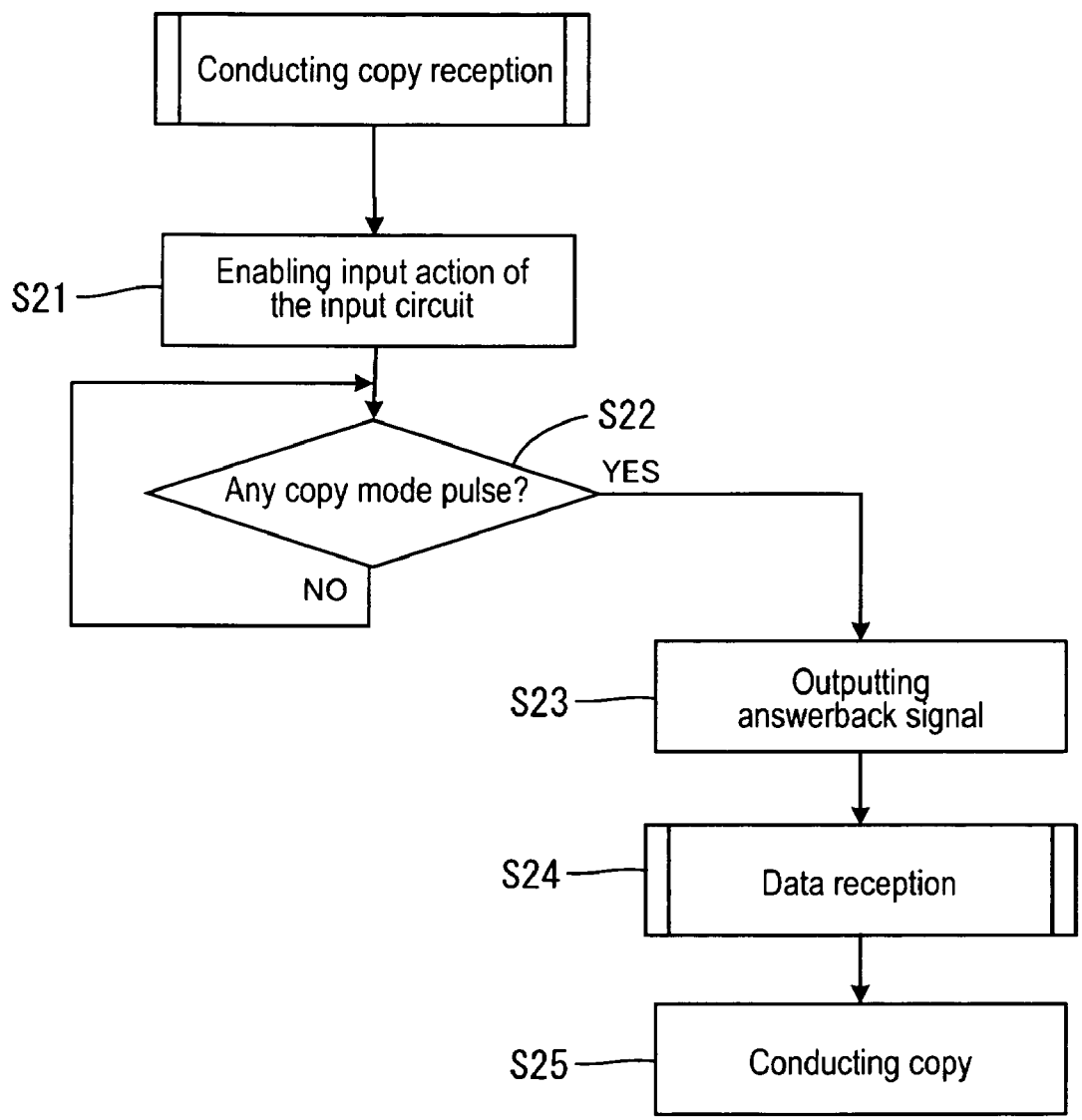
FIG. 6 is a flowchart showing a copy reception routine executed by a CPU in a pressure sensor.

On the other hand, back to FIG. 4, the pressure sensor 10b executes a copy reception (S5) since having been switched to the slave mode ("N" in S3). As shown in FIG. 6, the CPU 18 in the pressure sensor 10b disables an output action of the second output circuit 21, while enables an input action of the input circuit 22.

And after that, it is decided whether or not the copy mode pulse Se is input into this input circuit 22, and if so ("Y" in S22), the answerback signal Sf is output from the first output circuit 20 in S23. This causes the answerback signal Sf to be given to the input circuit 22 of the pressure sensor 10a in the master mode. Then, in S24, the setting information data D transmitted from the first output circuit 20 of the pressure sensor 10a in the master mode is received via the input circuit 22, thereby executing a copy action for updating this data into the memory 19 (S25). The CPU 18 here functions as a "controlling means" according to the present invention. After that, when a mode selector switch 13 switches again to the detection mode, the CPU 18 in the pressure sensor 10b repeatedly executes such as a detection action based on a newly updated setting information.

4. Effect of the Present Embodiment (1) According to the present embodiment, the output of the output signal Sc as well as the reception of the setting information data D are conducted using the common external connecting terminal 15d, by means of selectively enabling the second output circuit 21, whom the pressure sensor 10 essentially includes, and the input circuit 22 commonly connected to the external connecting terminal 15d that is connected to the second output circuit 21. Consequently, there is no need to provide a dedicated communication means for transmission of the setting information data D.

Moreover, in the present embodiment, the input circuit 22 is previously provided for the purpose of inputting the command signal Sd in the detection mode. The transmission of the setting information data D can therefore be fundamentally conducted without an additional hardware configuration.

(2) And also, one pressure sensor 10 can be switched either to the master mode as a copy source or to the slave mode as a copy destination.

(3) In this structure, each of the pressure sensors 10 is connector-connected via the connector cable 35, so that each connecting terminal is electrically connected. This facilitates a simpler connecting work compared with a structure in which, for example, each of the connecting terminals is electrically connected by being tied up with a connecting wiring.

(4) Each of the pressure sensors 10 conducts not only a setting of a setting information by means of data reception from the other detection sensor, but also directly conducts a setting by operations of the mode selector switch 13 and the up-down switch 14.

Embodiment 2

Figure 7:
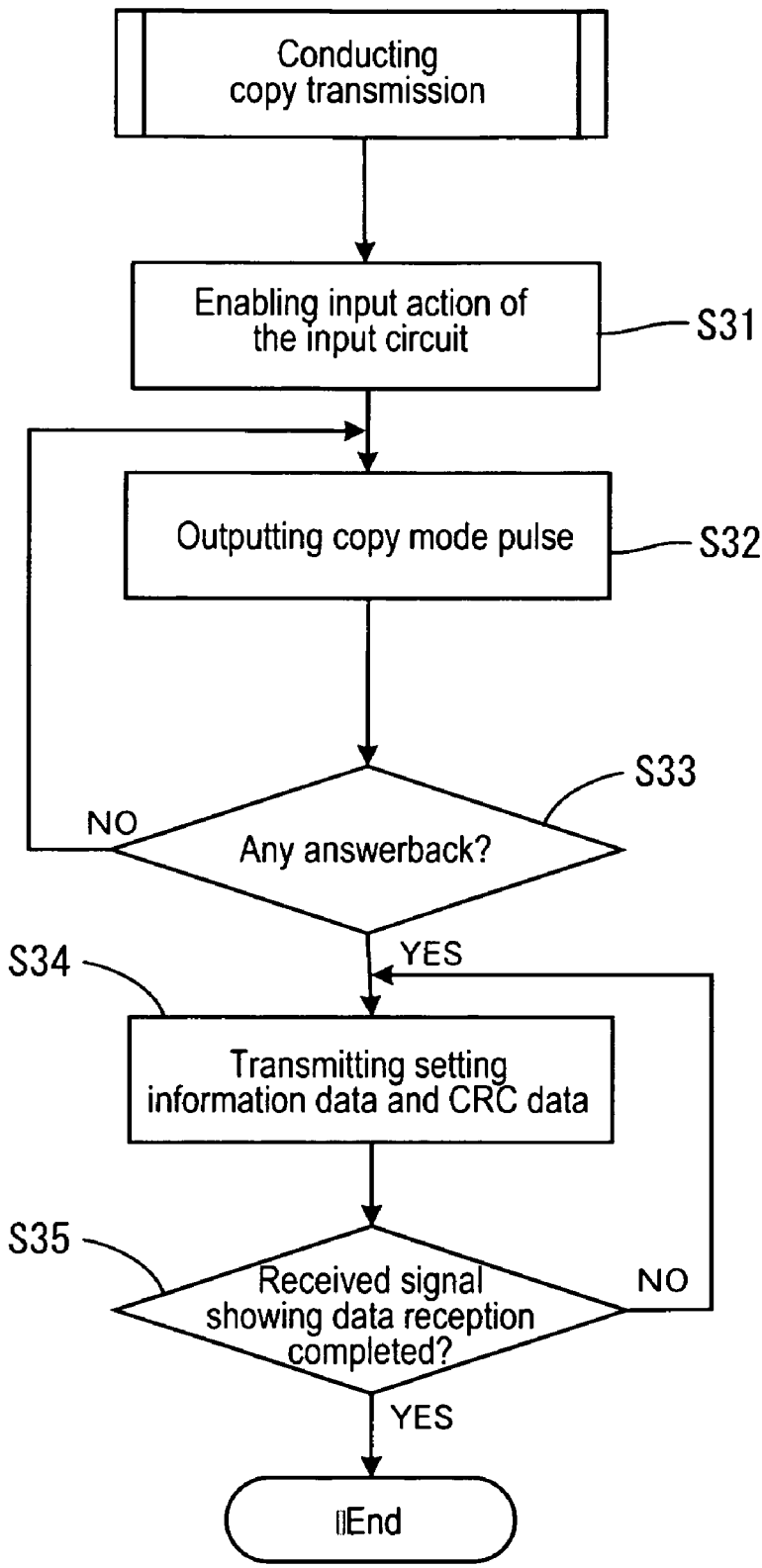
FIG. 7 is a flowchart showing a copy transmission routine executed by a CPU in a pressure sensor according to Embodiment 2.
Figure 8:
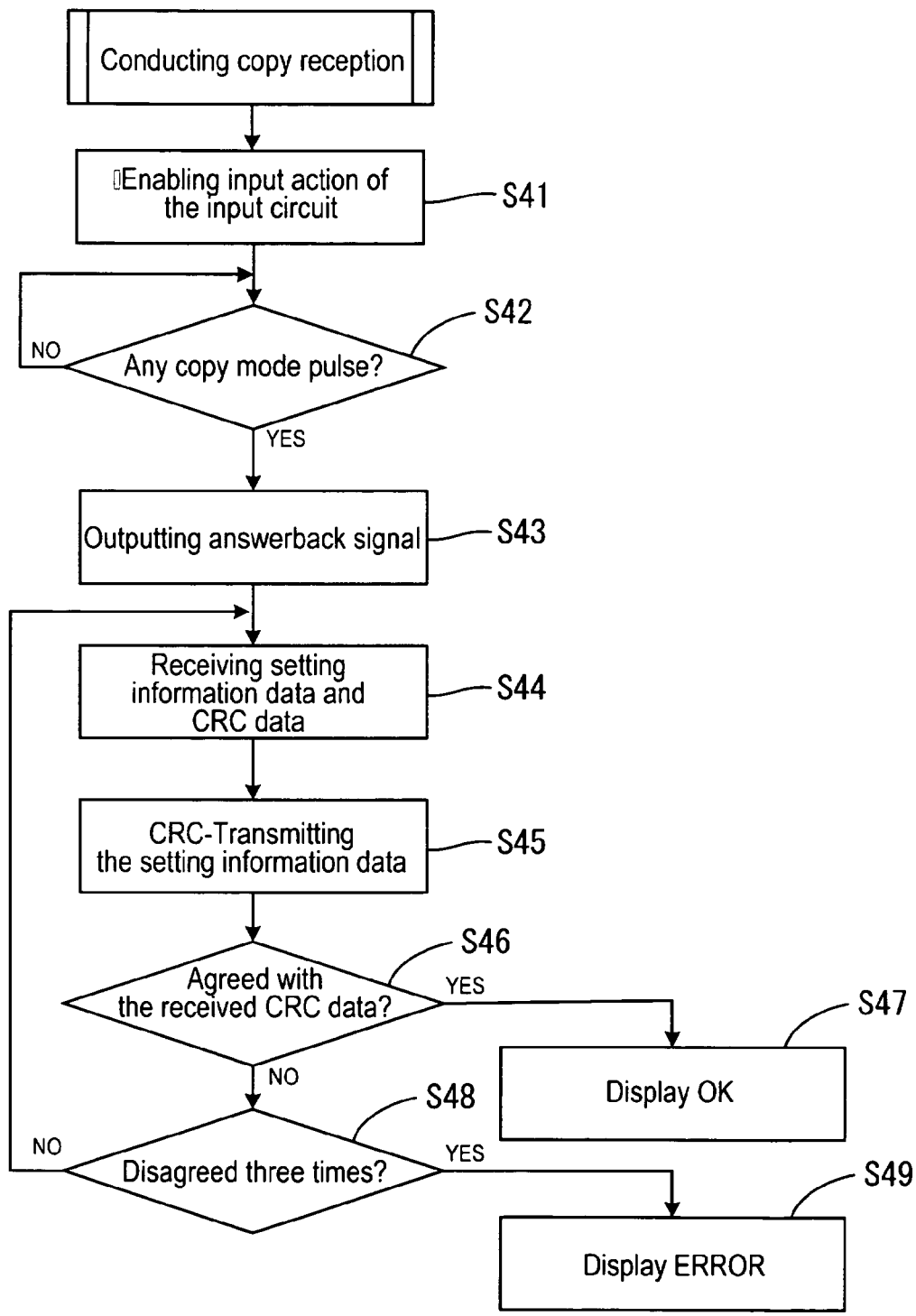
FIG. 8 is a flowchart showing a copy reception routine executed by a CPU in a pressure sensor according to Embodiment 2.

FIGS. 7 and 8 show Embodiment 2. The difference from the above embodiment is the contents of a copy transmission routine and of a copy reception routine of the CPU 18 in the copy mode, and the other elements are the same as those in Embodiment 1. Thus, a repetitive description is omitted by allocating the same symbols as Embodiment 1, thereby explaining different matters only.

(Master Mode)

The CPU 18 of the pressure sensor 10a in the master mode executes the copy transmission routine shown in FIG. 7. In S31, an output action of the second output circuit 21 is disabled while an input action of the input circuit 22 is enabled. After that, in S32, the copy mode pulse Se is outputted from the first output circuit 20 via the external connecting terminal 15c. This causes the copy mode pulse Se to be given to the external connecting terminal 15d of the pressure sensor 10b in the slave mode.

The CPU 18 then distinguishes whether or not the answerback signal Sf is received via the already-enabled input circuit 22 in S32, and waits ready until receiving the answerback signal Sf ("N" in S33). When received ("Y" in S33), it outputs a CRC data for reference as well as a setting information data D set in the memory 19 via the first output circuit 20 (S34). This causes the setting information data D and the CRC data to be given to the external connecting terminal 15d of the pressure sensor 10b in the slave mode. This transmission action of the setting information data D as well as the CRC data is repeatedly executed until an end of reception signal is received by the input circuit 22 (S35).

(Slave Mode)

The CPU of the pressure sensor 10b in the slave mode executes a copy reception routine shown in FIG. 8. An output action of the second output circuit 21 is disabled while an input action of the input circuit 22 is enabled in S41. And after that, it is decided whether or not the copy mode pulse Se is input into this input circuit 22 in S42, and if so ("Y" in S42), the answerback signal Sf is output from the first output circuit 20 in S43. This causes the answerback signal Sf to be given to the input circuit 22 of the pressure sensor 10a in the master mode.

Then, in S44, the setting information data D as well as the CRC data transmitted from the first output circuit 20 of the pressure sensor 10a in the master mode is received via the input circuit 22. Here, the CPU 18 functions as an "input detecting means" for deciding whether or not these data receptions are completed, and if so, instructs the display member 12 to display such as letters and symbols that indicate such completion. Here, the display member 12 functions as a "first informing means" according to the present invention.

Next, the received setting information data D is then converted into CRC in S45, and then, it is decided whether or not this converted CRC data agrees with the received CRC data in S46. Here, the CPU 18 functions as a "normal acquisition detecting means" according to the present invention. When the data agrees ("Y" in S46), the setting information data D is decided to have been normally acquired from the pressure sensor 10a in the master mode, and letters and symbols (for example, "OK") indicating the acquisition are displayed on the display member 12 (S47), while at the same time, the end of reception signal is output via the first output circuit 20 (corresponding to an "end of normal acquisition signal" in this invention). Here, the first output circuit 20 functions as a "response means" according to the present invention, and updates the acquired setting information in the memory 19. After that, when switched to the detection mode by the mode selector switch 13, the CPU 18 in the pressure sensor 10b then repeatedly executes a detection action on the basis of a newly updated setting information.

On the other hand, when the data does not agree ("N" in S46), an error signal indicating such disagreement is output from the first output circuit 20. When the pressure sensor 10a in the master mode received this error signal via the input circuit 22, it then transmits the setting information data D as well as the CRC data via the first output circuit 20. Additionally, when the data continuously disagreed for a prescribed number of times (for example, three times in the present embodiment) ("Y" in S48), such as letters and symbols indicating an error (for example, "ERR") are displayed on the display member 12 in S49. Here, the display member 12 functions as a "second informing means" according to the present invention.

According to the above constitution, the display of the display member 2 allows to know whether or not the reception of the setting information data D is completed, as well as the setting information data from the pressure sensor 10a in the master mode is normally acquired.

Embodiment 3

Figure 9:
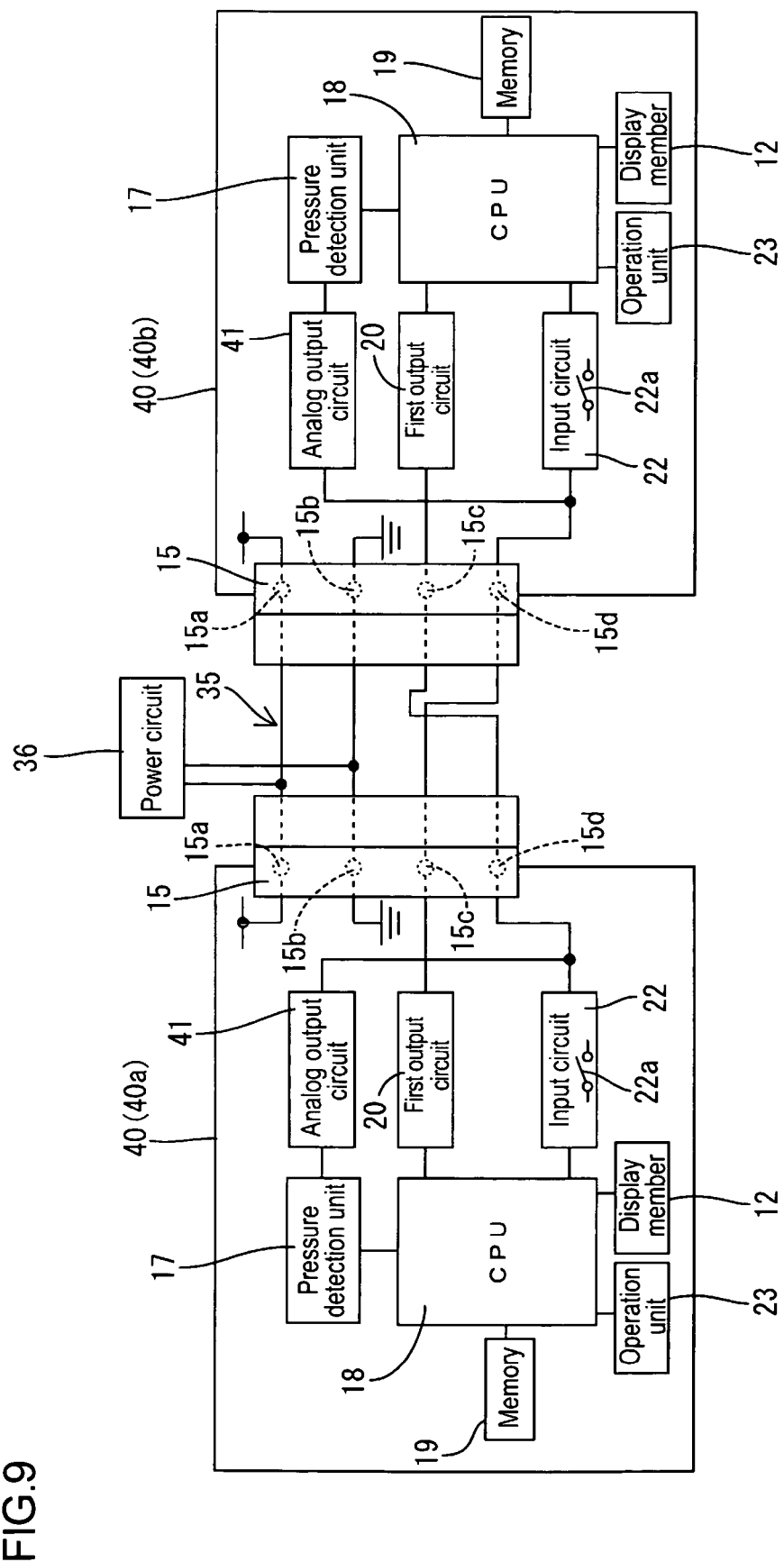
FIG. 9 is a block diagram (a connection status between pressure sensors) illustrating an electrical structure of a pressure sensor according to Embodiment 3.

FIG. 9 illustrates Embodiment 3. The difference from the above Embodiment 1 is the constitution of an outputting means, and the other elements are the same as those in Embodiment 1. Therefore a repetitive description is omitted by allocating the same symbols as Embodiment 1, thereby explaining different matters only.

As illustrated in FIG. 9, each of pressure sensors 40 (40a, 40b) according to the present embodiment does not include the above-mentioned second output circuit 21 relative to the pressure sensors 10 (10a, 10b) in Embodiment 1, and there is provided instead an analog output circuit 41 (corresponding to an "outputting means" in the present invention) for outputting and amplifying a detection signal Sa (corresponding to an "output signal" in the present invention) sent from the pressure detection unit 17 as an analog signal. This outputting side and the inputting side of the input circuit 22 are commonly connected with the external connecting terminal 15d. When enabling an input action of the input circuit 22, a closing action is taken to the closing switch 22a, while at the same time, the amplification degree of the analog output circuit 41 is decreased, so that the external connecting terminal 15d is not fundamentally affected. When enabling an output action of the analog output circuit 41, the amplification degree thereof is reset, and on the other hand, an opening action to the closing switch 22a in the input circuit 22 is taken.

Even in such constitution, the setting information can be copied from the pressure sensor 40a in the master mode to the pressure sensor 40b by means of the control of the CPU 18 mentioned in the above Embodiments 1 and 2, thereby obtaining the same effect as Embodiment 1.

Embodiment 4

Figure 10:
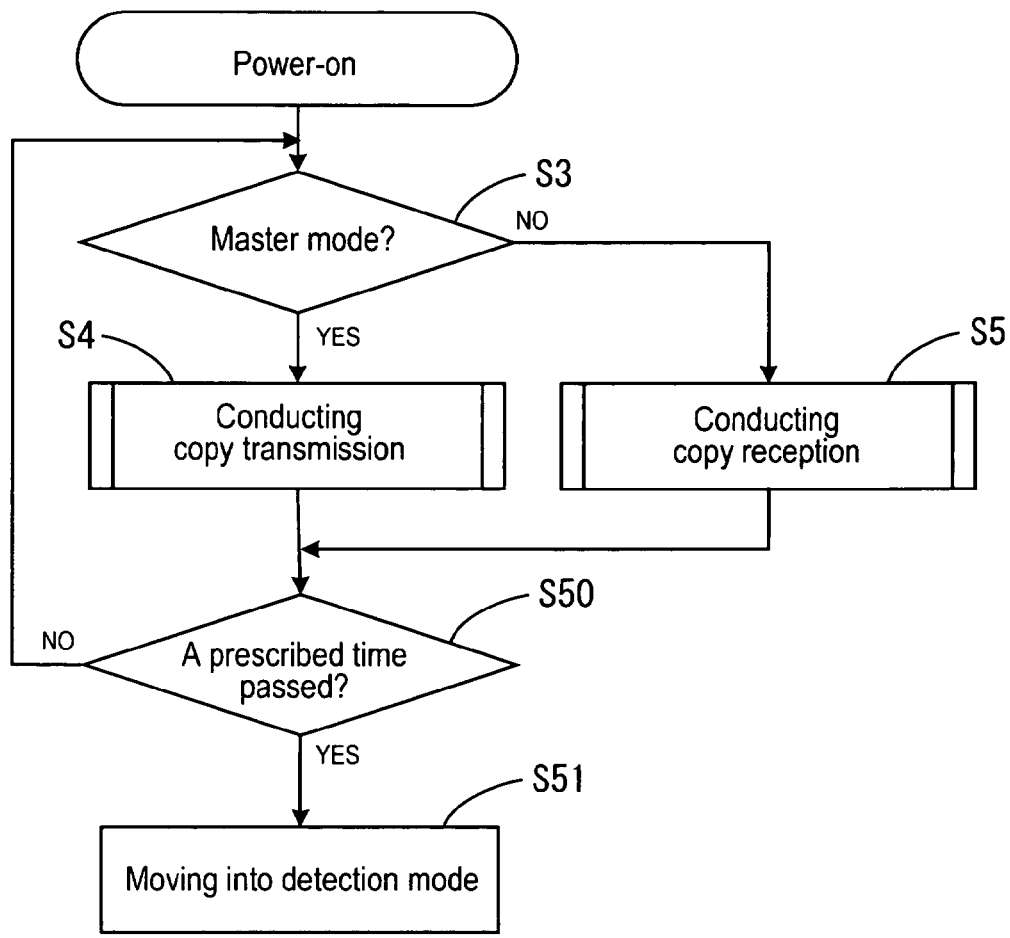
FIG. 10 is a flowchart showing a copy reception routine executed by a CPU in a pressure sensor according to Embodiment 4.

FIG. 10 illustrates Embodiment 4. A repetitive description is omitted by allocating the same symbols to the same elements as Embodiment 1, thereby explaining different matters only.

In Embodiments 1, 2 and 3, the detection mode is set as a default setting at the time of applying the power-supply, however, the present invention is not limited to this, and the structure illustrated in FIG. 10 may be included. In other words, each of the detection sensors 10 automatically moves into the copy mode if it has been switched to the master mode at the time of applying the power-supply ("Y" in S3), and forcibly executes the copy transmission for a prescribed time, and then, moves into the detection mode after a prescribed time ("Y" in S50).

On the other hand, when it has been switched to the slave mode ("N" in S3), each of the detection sensors 10 automatically moves into the copy mode, and forcibly executes the copy reception for a prescribed time, and then, moves into the detection mode after a prescribed time ("Y" in S50).

This constitution allows the power-supply to be applied by connector-connecting two pressure sensors 10a and 10b, which have been previously and respectively switched to the master mode and the slave mode via the connector cable 35, and thereby automatically copy the setting information.

Embodiment 5

Figure 11:
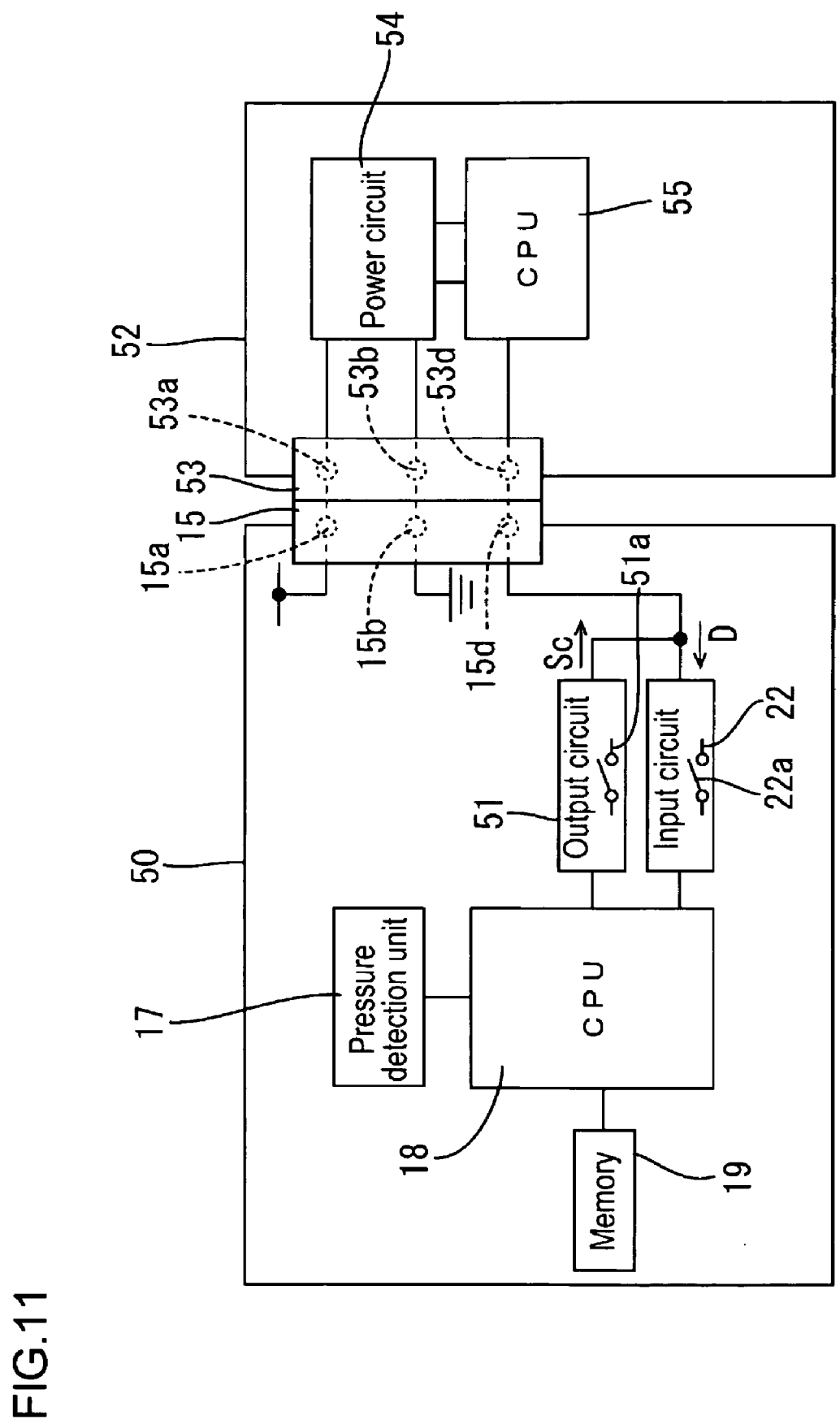
FIG. 11 is a block diagram illustrating an electrical structure of a pressure sensor according to Embodiment 5.

FIG. 11 illustrates Embodiment 5. A repetitive description is omitted by allocating the same symbols to the same elements as Embodiment 1, thereby explaining different matters only.

The pressure sensors 10 and 40 in each of the above-mentioned Embodiments are a two-output type, however, a pressure sensor 50 in the present embodiment is one-output type comprising an output circuit 51 (corresponding to a "outputting means" in the present invention) that is similar to the above second output circuit, and the outputting side of this output circuit 51 is commonly connected with the inputting side of the input circuit 22 via the external connecting terminal 15d. In addition, the operation unit 23 and the display member 12 in the above are not comprised therein.

In order to change and set a setting information, as illustrated in FIG. 11, a connector 53 is connector-connected to a controller 52 (corresponding to a "external device for setting information output" in this embodiment), thereby obtaining a setting information from the controller 52.

This connector-connection enables the power-supply to be applied to the pressure sensor 50 via power supplying terminals 53a and 53b that are continuing to a power circuit 54 in the controller 52, and the pressure sensor 50 then automatically moves to the copy mode. In the copy mode, the CPU 18 disables an output action by opening a closing switch 51a in an output circuit 51, while at the same time, enabling an input action by closing a closing switch 22a in the input circuit 22. After that, the setting information data D transmitted from a CPU 55 in the controller 52 via a connecting terminal 53d is acquired via the input circuit 22, and set into the memory 19.

After a prescribed time from applying the power-supply, the CPU 18 then automatically moves into the detection mode, and outputs the output signal Sc at each detection action via the external connecting terminal 15d to the controller 53 by enabling the output action of the output circuit 51.

Even in such constitution, the output of the output signal Sc at the time of the detection mode as well as the input of the setting information data D at the time of the copy mode may be conducted commonly through the external connecting terminal 15d, and therefore, there is no need to provide a dedicated communication means for the setting information data D.

Embodiment 6

Figure 12:
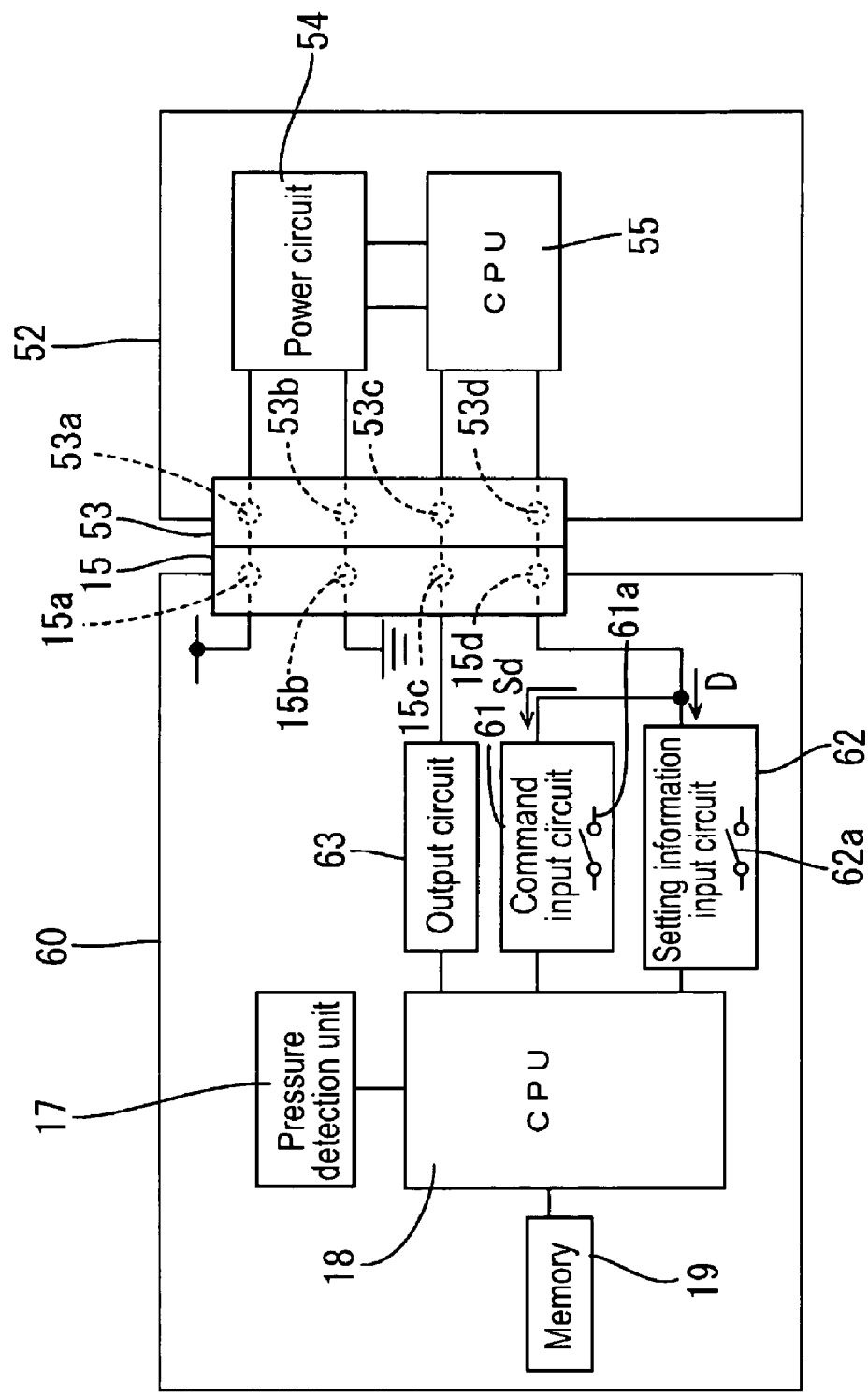
FIG. 12 is a block diagram illustrating an electrical structure of a pressure sensor according to Embodiment 6.

FIG. 12 illustrates Embodiment 6. A repetitive description is omitted by allocating the same symbols to the same elements as Embodiments 1 and 5, thereby explaining different matters only.

A pressure sensor 60 comprises an output circuit 63 similar to the first output circuit in Embodiment 1, a command input circuit 61, and a setting information input circuit 62, and the inputting side of these input circuits 61 and 62 are commonly connected to the external connecting terminal 15d.

This connector-connection with the controller 52 enables the power-supply to be applied to the pressure sensor 60, which then moves into the copy mode. In the copy mode, the CPU 18 disables an input action by opening a closing switch 61 in a command input circuit 61, while enabling an input action by closing a closing switch 62 in a setting information input circuit 62. After that, the setting information data D transmitted from the CPU 55 in the controller 52 via a connecting terminal 53d is acquired via the command input circuit 62, and set into the memory 19.

After a prescribed time from applying the power-supply, the CPU 18 then automatically moves into the detection mode, and inputs the command signal Sd sent from the controller 52 between the execution timings of detection action via the external connecting terminal 15d by enabling an input action only of the command input circuit 51.

Here, the setting information input circuit 62 for inputting the setting information data D needs to be constituted so as to read, such as the pulse duration of its input signal. On the other hand, the command input circuit 61 for inputting the command signal Sd sent from the outside (for example, such as a zero adjustment command signal, an automatic reference command signal, and an automatic teaching command signal) may be structured simply so that it detects only a high-low level of the input signal. Moreover, acquisition of the setting information is not so frequently performed. Considering the foregoing, the present embodiment is configured such that the setting information input circuit 62 and the command input circuit 62 are respectively an individual circuit, and an input action of the command input circuit 62 is enabled only when acquiring a setting information (at the time of applying the power-supply).

Embodiment 7

Figure 13:
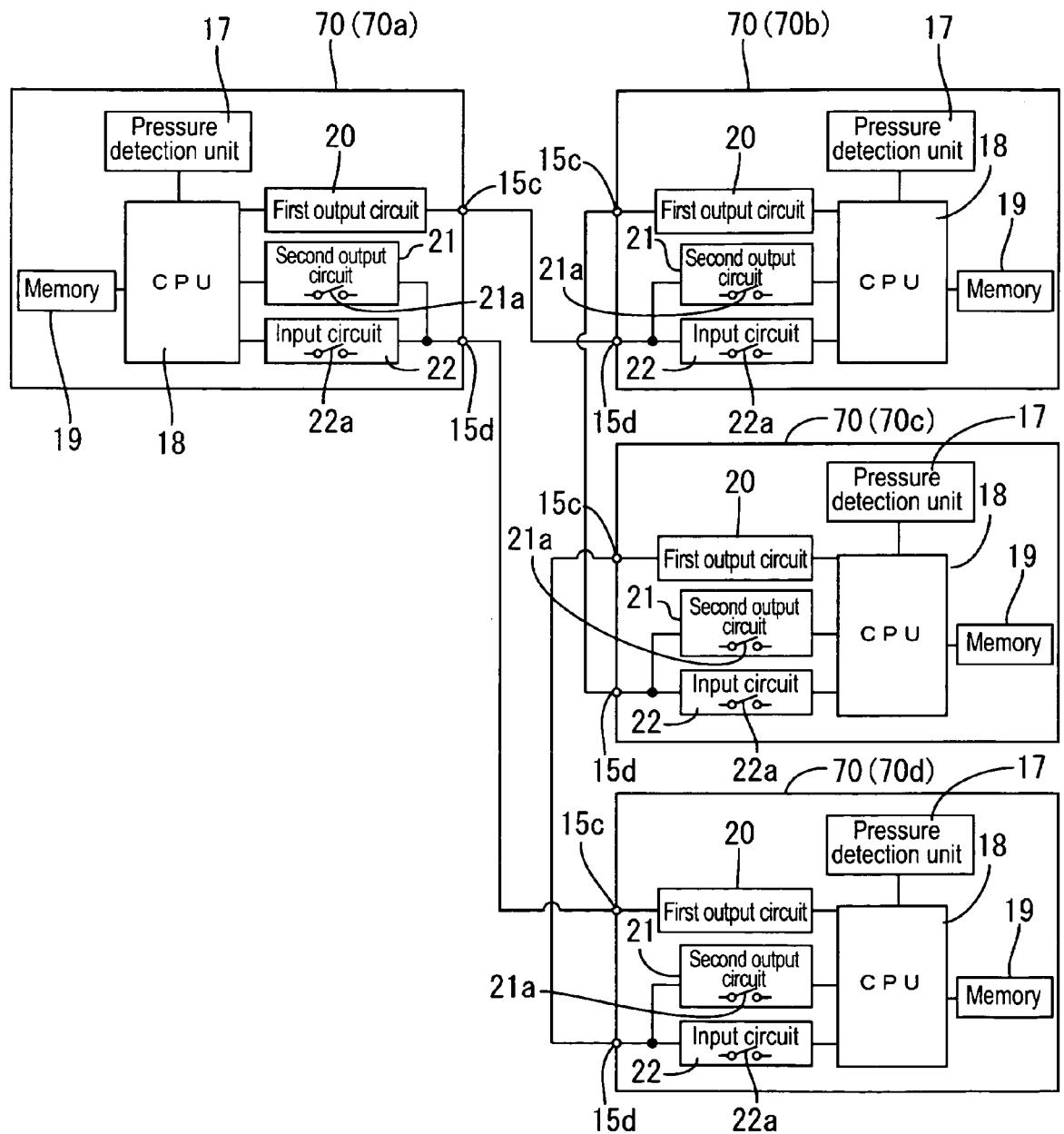
FIG. 13 is a block diagram illustrating an electrical structure of a pressure sensor according to Embodiment 7.

Fig. 13 illustrates Embodiment 7. A repetitive description is omitted by allocating the same symbols to the same elements as Embodiment 1, thereby explaining different matters only.

The present embodiment comprises three or more pressure sensors 70 (four units in this embodiment), wherein the setting information set in a pressure sensor 70a is sequentially copied to the next pressure sensor 70b, and further to a pressure sensor 70c.

Each of the pressure sensors 70 is configured by comprising a pressure detection unit 17, a CPU 18, a memory 19, a first output circuit 20, a second output circuit 21, and an input circuit 22. The outputting side of the first output circuit 20 is connected to the external connecting terminal 15c, while the outputting side of the second output circuit 21 and the inputting side of the input circuit 22 are commonly connected to the external connecting terminal 15d. Additionally, the output action of the second output circuit 21 and the input action of the input circuit 22 are selectively enabled by means of controlling the CPU 18. Each of the pressure sensors 70 is respectively turned on with the power supply by a power-supplying means not shown.

And then, in regards to each of the pressure sensors 70, the external connecting terminal 15c connected to the first output circuit 20 is electrically connected to the external connecting terminal 15d in the other pressure sensor 70, while the external connecting terminal 15d connected to the second output circuit 21 and to the input circuit 22 is connected to the other pressure sensor 70 other than the above-mentioned other pressure sensor 70. This allows each of the pressure sensors 70 to be connected, so as to input the signal sent from one pressure sensor 70 via the external connecting terminal 15d, and moreover, to output the signal sent from the first output circuit 20 to the other pressure sensor 70.

In such constitution, for example, the setting information is already set in the memory 10 in the first pressure sensor 70a. When this setting information is copied to the second to the fourth pressure sensors 70b, 70c and 70d, four pressure sensors 70 are firstly connected as shown in FIG. 13, and then the operation unit 23 (not shown in FIG. 13) set all of them into the copy mode. After that, the first pressure sensor 70a is set to the master mode, and then the second pressure sensor 70b is set to the slave mode. And, the first pressure sensor 70a outputs the setting information data D from the first output circuit 20, and then, the second pressure sensor 70b acquires said setting information data D via the enabled input circuit 22, so as to set it into the memory 19.

After that, when the second pressure sensor 70b is switched to the master mode, similar to the above, the second pressure sensor 70b outputs the setting information data D from the first output circuit 20, and then, said setting information data D is acquired by the third pressure sensor 70c via the enabled input circuit 22, thereby being set into the memory 19. Subsequently, as described above, the setting information data D is then copied to the fourth pressure sensor 70d by switching the third pressure sensor 70c to the master mode. After that, the first pressure sensor 70a receives the setting information data D from the fourth pressure sensor 70d, thereby recognizing the completion of the normal copy. This recognition result is then displayed on the display member 12 (omitted in FIG. 13). Here, the setting information data D sent from the fourth pressure sensor 70d may be checked against the setting information recorded in the memory 19 as a copy source, so that a display pattern may be displayed on the display member 12 according to this check result.

In addition, the second to the fourth pressure sensors 70b, 70c and 70d may be configured so as to automatically move to the master mode from the slave mode under the condition that the setting information data is set in their own memories 19.

Embodiment 8

Figure 14:
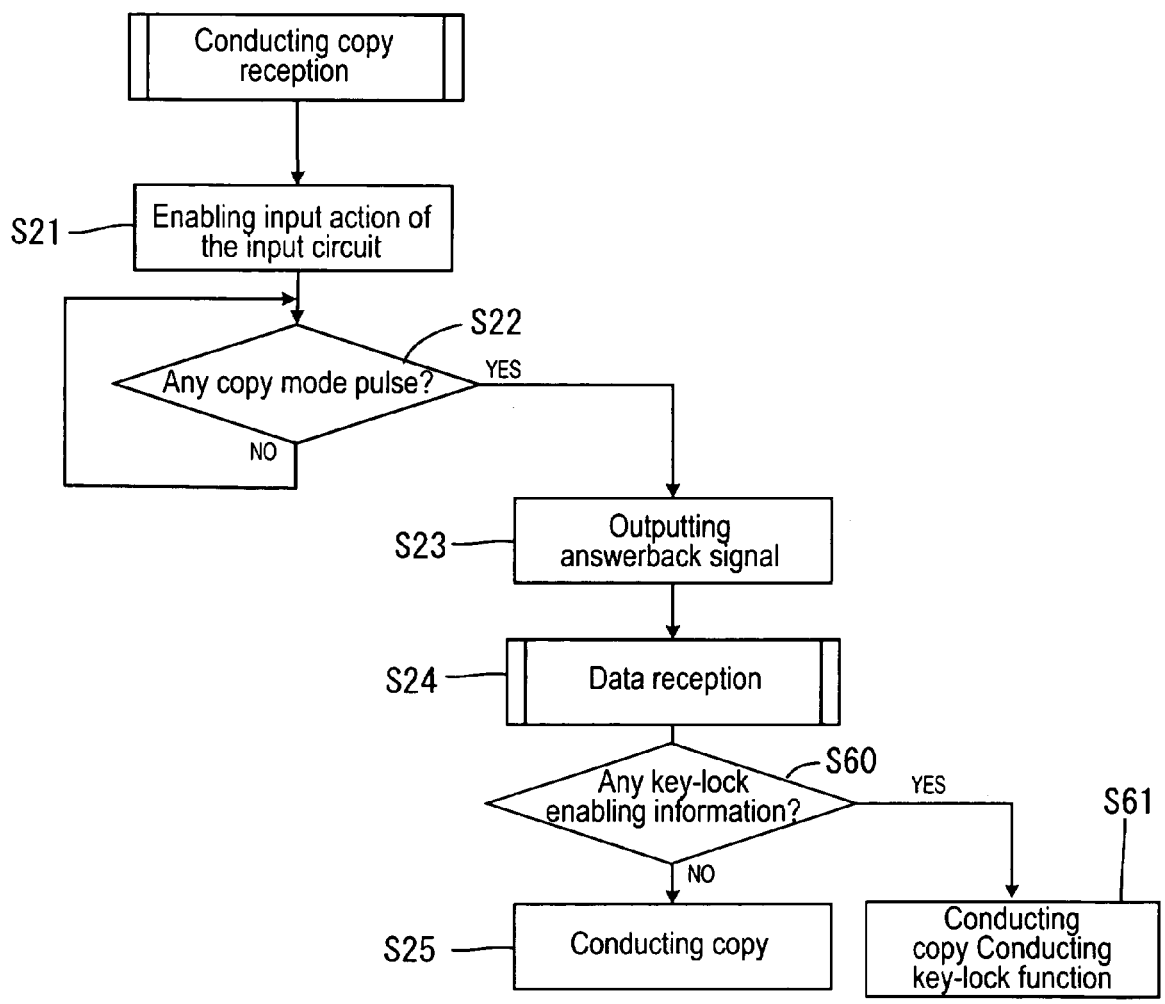
FIG. 14 is a flowchart showing a copy reception routine executed by a CPU in a pressure sensor according to Embodiment 8.

FIG. 14 illustrates Embodiment 8. A repetitive description is omitted by allocating the same symbols to the same elements as Embodiment 1, thereby explaining different matters only.

The pressure sensor 10 in this embodiment comprises a so-called key-lock function that prevents a setting of the setting information copied in the memory 19 from being changed by the operation of the above-mentioned operation unit 23, on the basis of the setting information data D from an external device for setting information output. The pressure sensor 10 in the condition that the key-lock function is executed, for example, displays a presently set value of each setting information on the display member 12a, while the CPU 18 specifies an inhibition action so that these display values are not changed even by the operation of the up-down switch 14. As an another method, the CPU 18 may be configured so that, while enabling the display value on the display member 12a to be changed by the operation of the up-down switch 14, it does not accept a deciding action, and thereby preventing the setting information copied in the memory 19 from being rewritten and updated. Consequently, the CPU 18 also functions as an "inhibiting means" in this invention.

And the pressure sensor 10 also executes the above-mentioned key-lock function by, for example, a particular operation, i.e. long-pressing the mode selector switch 13 and the up-down switch 14 for a prescribed time, and again cancels the key-lock function by a particular operation similar to the above. In addition, when in the condition that the key-lock function is executed, the pressure sensor 10a in the master mode in FIG. 3 outputs the setting information data D including the key-lock enabling information, which indicates the execution of the key-lock function, in S14 in FIG. 5. On the other hand, when in the condition that the key-lock function is canceled, the pressure sensor 10a outputs the setting information data D including the key-lock disabling information, which indicates the cancel of the key-lock function, in S14.

On the other hand, in the pressure sensor 10b in the slave mode, when the setting information data D transmitted from the first output circuit 20 in the pressure sensor 10a in the master mode in S24 is received via the input circuit 22 as shown in FIG. 14, the CPU 18 distinguishes whether or not the key-lock enabling information is added to said setting information data D in S60. The CPU 18 then executes a copy action in S25 if the key-lock enabling information is not added therein ("N" in S60), however, does not execute the key-lock function.

At the same time, when the key-lock enabling information is added therein ("Y" in S60), the CPU 18 enables the above-mentioned key-lock function after executing a copy action in S61. This prevents the copied setting information in the pressure sensor 10b from being easily changed, as long as the above-mentioned particular operation is not performed by the operation unit 23.

The above constitution enables the setting information, that has been copied in the memory 19 by executing the copy function, to be prevented from being easily changed by a user. In addition, this key-lock function is, needless to say, applicable to the above Embodiments 2 to 7.

Embodiment 9

Figure 15:
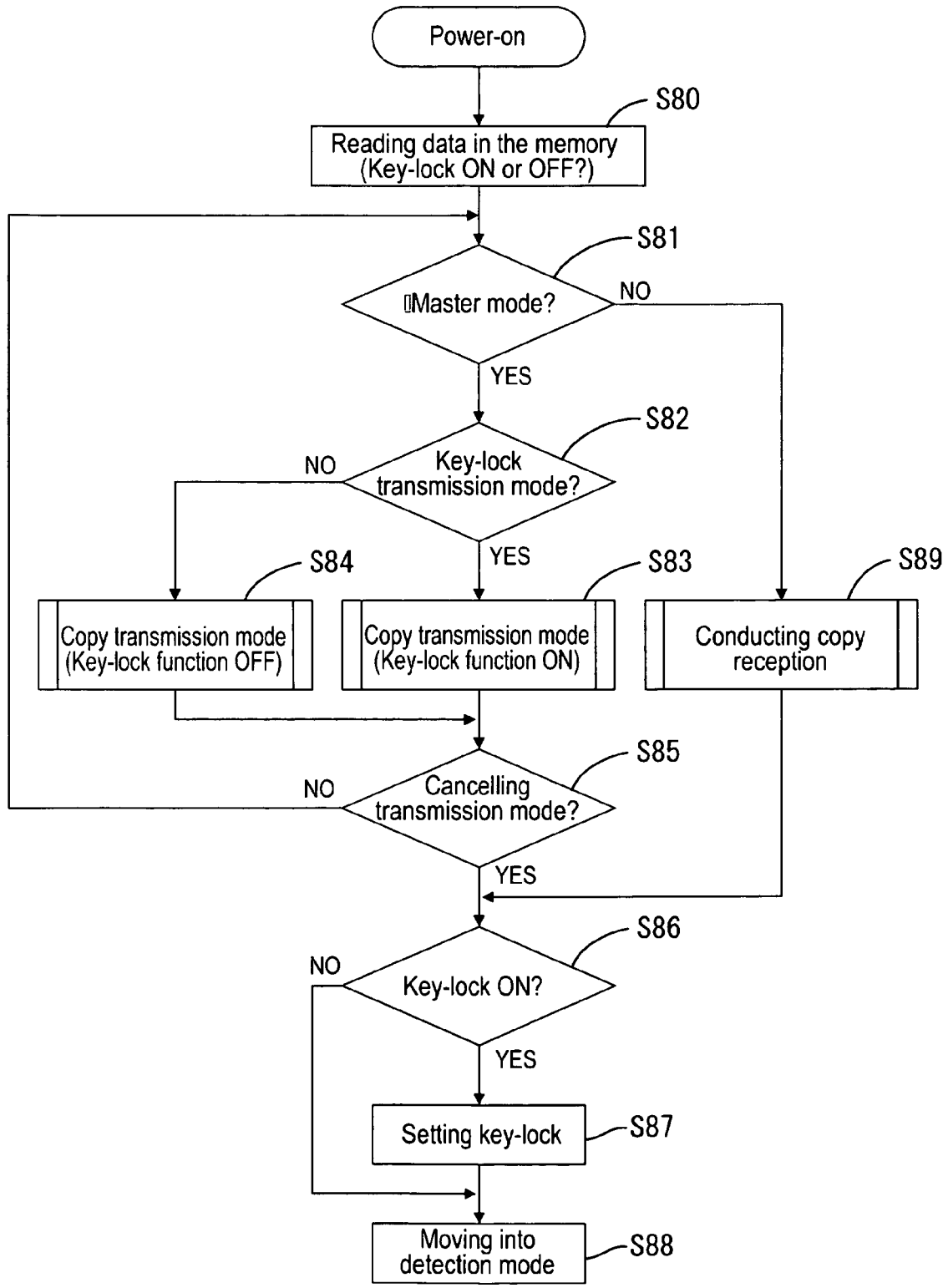
FIG. 15 is a flowchart showing a main routine executed by a CPU in a pressure sensor according to Embodiment 9.
Figure 16:
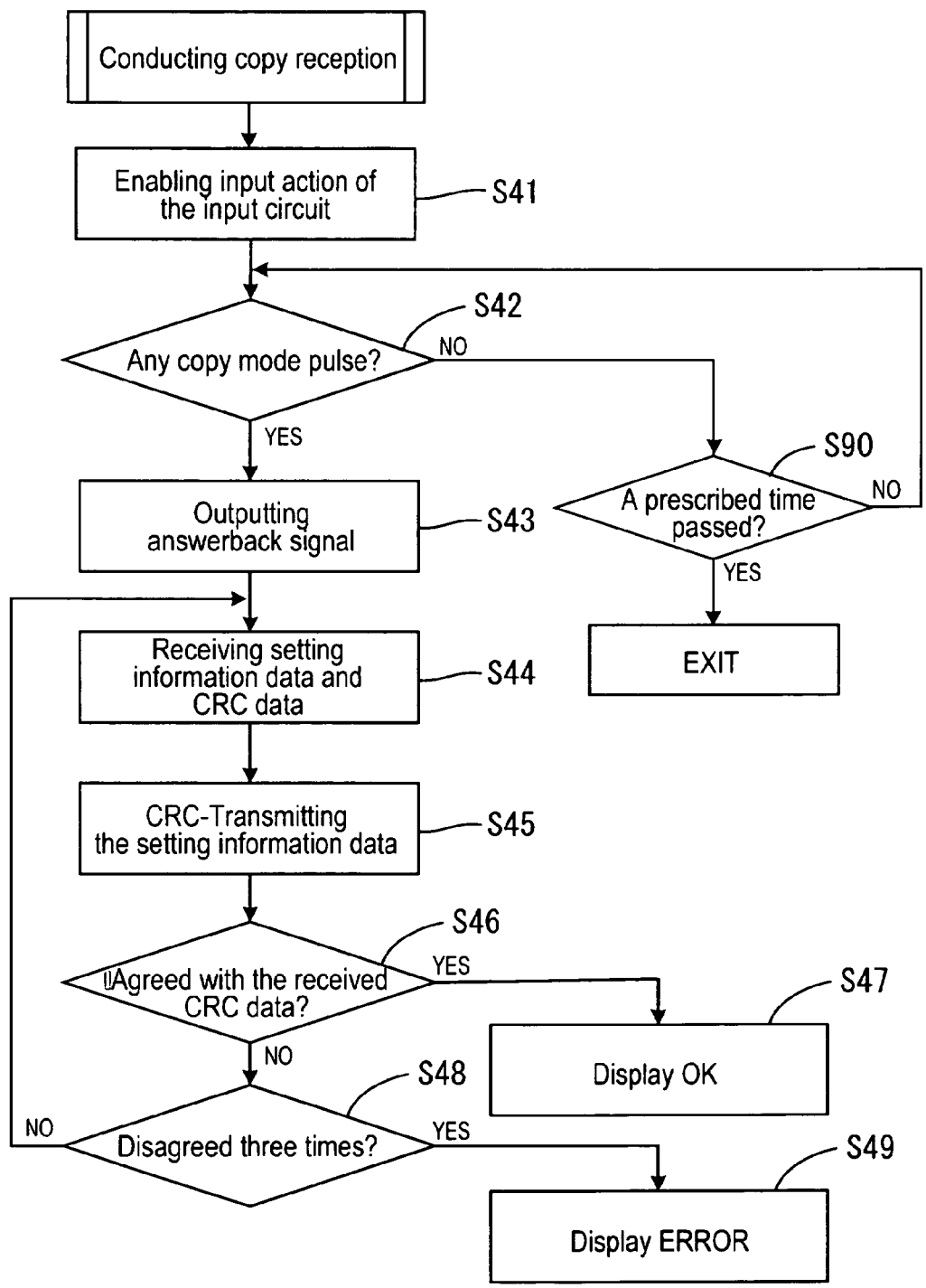
FIG. 16 is a flowchart showing a copy reception routine executed by a CPU in a pressure sensor.

FIGS. 15 and 16 illustrate Embodiment 9. As in the case of the above Embodiment 8, each of the pressure sensors 10 in this embodiment also comprises a key-lock function. Each of the pressure sensors 10 is configured so as to be selectively set to the key-lock transmission mode and to the normal transmission mode by, for example, a prescribed operation of the operation unit 23.

As illustrated in FIG. 15, when the power-supply is applied to each of the pressure sensors 10, the CPU 18 then reads each data that is recorded in the memory 19 after including both enabling/disabling information of the key-lock function in S80.

(Master Mode)

In S82, the CPU 18 distinguishes whether its own pressure sensor 10 is set to the key-lock transmission mode if the pressure sensor 10 has been switched to the master mode ("Y" in S81). When the CPU 18 distinguishes the key-lock transmission mode is set ("Y" in S82), then, in S 83, outputs the setting information data D including the key-lock enabling information that indicates the execution of the key-lock function. In particular, the CPU 18 executes a basically similar processing as the foregoing FIG. 5, and then outputs the setting information data D with the key-lock enabling information added therein in S14 in the same figure.

On the other hand, when the CPU 18 distinguishes that the normal transmission mode is set ("N" in S82), then, in S 85, outputs the setting information data D with the key-lock disabling information, that indicates the cancel of the key-lock function, added therein. In particular, the CPU 18 executes a basically similar processing as the foregoing FIG. 5, and then outputs the setting information data D with the key-lock disabling information added therein in S14 in the same figure.

After that, the CPU 18 repeatedly executes the processing mentioned in the above S81 to S85 until the transmission mode (the key-lock transmission mode and the normal transmission mode) is canceled in S85. In FIG. 3, the CPU 18 of the pressure sensor 10a in the master mode executes the above processing.

In the pressure sensor 10a, when the transmission mode is canceled by, for example, being switched to the detection mode, the CPU 18 then reads the enabling/disabling information of the key-lock function set in its own memory 19. When the information instructs the enabling of the key-lock function ("Y" in S86), the CPU 18 in its own pressure sensor 10a executes the key-lock function, and then moves to the detection mode (S87, S88). On the other hand, when the disabling of the key-lock function is instructed ("N" in S86), the CPU 18 moves to the detection mode without executing the key-lock function in its own pressure sensor 10a (S88).

(Slave Mode)

If the pressure sensor 10 has been switched to the slave mode ("N" in S81), the CPU 18 executes the copy reception routine illustrated in FIG. 16 in S89. The processing here is basically the same as the copy reception routine in the foregoing FIG. 8. The difference is as follows. In short, the CPU 18 disables an output action of the second output circuit 21 in S41, while at the same time, enabling an input action of the input circuit 22, before distinguishes whether the above-mentioned copy mode pulse Se is input in said input circuit 22 in S42. When the copy mode pulse S2 is input within a prescribed time ("Y" in S42, "N" in S90), the answerback signal Sf is then output from the first output circuit 20 in 43. In response, the CPU 18 moves to S86 in FIG. 17, when there has not been the copy mode pulse Se input within a prescribed time ("N" in S42, "Y" in S90).

By means of such processing, the pressure sensor 10b in the slave mode waits for the input of the copy mode pulse Se in S42 when the power-supply is applied. If there has not been an input within a prescribed time, the CPU 18 in the pressure sensor 10*b* then reads out the enabling/disabling information of the key-lock function set in its own memory 19. When the copy reception has not ever been executed, the enabling/disabling information of the key-lock function is regarded as indicating the disabling of the key-lock function, and thus the key-lock function is not executed ("N" in S86).

In response, when the copy mode pulse Se is input within a prescribed time in S42, the CPU 18 then conducts a data reception of such as the setting information data D sent from the pressure sensor 10*a* (S44), and then, displays an "error" when the regular setting is impossible (S49), or executes copy action while displaying "OK" when the regular setting is possible (S47).

Here, when the setting information data D received in S44 is with the key-lock enabling information added therein, the CPU 18 then writes this information in the memory 19. And after "ERROR" or "OK" being displayed on the display members 12*a* or 12*b* (S49, s47), the CPU 18 then restarts the processing from S80 in FIG. 17 when the power-supply is reapplied to the pressure sensor 10*b*, thereby reading each data recorded in the memory 19 with the enabling/disabling information of key-lock function included therein. When the CPU 18 goes through the copy reception routine in S89 without an input of the copy mode pulse Se within a prescribed time, it then decides in S86 whether or not to execute the key-lock function on the basis of the enabling/disabling information of the key-lock function read out in the above-mentioned S80. As mentioned above, since the key-lock enabling information, that has been added to the setting information data D prior to the power-reapplication, is written in the memory 10 here, the CPU 18 instructs its own pressure sensor 10*a* to execute the key-lock function, and moves to the detection mode (S87, S88).

This constitution prevents the setting information of its own, that has been copied in the memory 19 by executing the copy function, from being easily changed by a user. In addition, the key-lock function described in the present embodiment is, needless to say, applicable to the above Embodiments 1 to 7.

Other Embodiments

With embodiments of the present invention described above with reference to the accompanying drawings, it is to be understood that the invention is not limited to those precise embodiments, and the embodiments as below, for example, can be within the scope of the present invention. And moreover, other than the below, various modifications and alterations that do not depart from the scope and spirit of this invention may be applicable to this invention.

(1) In the above Embodiment 1, either the first output circuit 20 or the second output circuit 21 are constituted so as to output an output signal according to the large-small comparison result between the detected pressure value and the threshold value. However, the present invention is not limited to this, and the first output circuit 20 and the second output circuit 21 may be constituted so that the detection signal Sa that has been A/D converted is directly output from the pressure detection unit 17.

(2) In each of the above embodiments, the closing switches are respectively built-in for the purpose of selectively enabling the output circuit and the input circuit. However, the present invention is not limited to this, and may be configured to have a selector switch at the common-connecting point of the both circuits.

(3) In the above embodiments, the display member 12 is composed of a liquid crystal panel as an informing means. However, this invention is not limited to this, and may be configured so as to inform with a display light composed of, for example, an LED by the lighting pattern thereof. And also, a sound-producing means such as a buzzer may be comprised to inform.

(4) The above Embodiment 5 may also be configured that the operation unit 23 and the display member 12 are provided so as to enable to switch between the master mode and the slave mode, and that the pressure sensor 10 that is switched to the master mode and the pressure sensor 10 that is switched to the slave mode are connector-connected. And then, the pressure sensor 10 in the master mode may output its own setting information data D by enabling an output action of the output circuit 51, while at the same time, the pressure sensor 10 in the slave mode may input said setting information data D via the external connecting terminal 15*d* by enabling an input action of the input circuit 22 to set it in the memory 19.

(5) The above Embodiment 2 is configured so that a prescribed error action is conducted when the converted CRC data and the received CRC data do not agree for three successive times. However, the present invention is not limited to this, and the error action may be conducted at the disagreement for one time or a plurality of times other than three times.

(6) The above Embodiment 8 is configured so as to make the key-lock function to be executed at the side of the pressure sensor 10*b* on the basis of the key-lock enabling information added to the setting information data D sent form the external device (the other pressure sensor 10*a*). However, the present invention is not limited to this, and the key-lock function may be in the execution state at any time when the copy action is executed.

The invention claimed is:

1. A detection sensor configured to operate in a master mode or a slave mode, the detection sensor comprising:
    a detection unit configured to detect a physical value change in a detection area;
    an output circuit configured to output an output signal related to the physical value change detected by the detection unit;
    an external connecting terminal configured to be electrically connected to a connecting terminal of an external device in the master triode and a connecting terminal of a setting information output device in the slave mode, the external connecting terminal being connected to the output circuit to transmit the output signal from the output circuit to the external device;
    an input circuit configured to connect to the external connecting terminal to receive first setting information from the setting information output device;
    a memory configured to store the first setting information and a second setting information related to operation of the detection unit;
    a switch configured to enable and disable the output circuit and the input circuit;
    a mode selector configured to switch the detection sensor between the master mode and the slave mode; and
    a control unit configured to:
    receive a detection signal related to the physical value change from the detection unit;
    control the switch to enable the output circuit to output the second setting information to the external device in the master mode;
    control the switch to enable the input circuit to receive the first setting information from the setting information output device in the slave mode; and
    store the received first setting information in the memory.

2. The detection sensor according to claim 1, wherein the controlling unit controls the switch to enable the input circuit for a prescribed time from when a power-supply is applied.

3. The detection sensor according to claim 1, wherein
the input circuit receives a command signal from the external device connected to the external connecting terminal, and
the control unit controls the switch to enables enable the input circuit to receive the command signal.

4. The detection sensor according to claim 1, further comprising a connector in which the external connecting terminal is provided and electrically connected to the connecting terminal of the setting information output device.

5. The detection sensor according to claim 1, further comprising an informing member, wherein
the control unit is further configured to determine whether the input circuit has received the first setting information from the setting information output device, and
the informing member indicates that the input circuit has received the first setting information if the reception of the first setting information is determined by the control unit.

6. The detection sensor according to claim 1, further comprising an informing member, wherein
the control unit is further configured to determine whether the input circuit has received the first setting information from the setting information output device in a normal manner, and
the informing member indicates a result of the determination performed by the control unit.

7. The detection sensor according to claim 6, further comprising a response output circuit configured to output a signal indicating an end of the reception of the first setting information in the normal manner to the setting information output if the reception of the first setting information in the normal manner is determined by the control unit.

8. The detection sensor according to claim 1, further comprising an operation unit to alter at least one of the first setting information and the second setting information stored in the memory.

9. The detection sensor according to claim 8, wherein the control unit is further configured to inhibit the alteration of the first setting information by the operation unit.

10. The detection sensor according to claim 9, wherein the control unit is further configured to:
determine whether the first setting information includes an inhibition instruction to inhibit the alteration of the first setting information: and
inhibit the alteration by the operation unit if the first setting information includes the inhibition action.

11. The detection sensor according to claim 9, wherein the control unit is further configured to cancel the inhibition of the alteration by the operation unit.

12. A detection sensor configured to operate in a master mode or a slave mode, the detection sensor comprising:
a detecting unit configured to detect a physical value change in a detection area;
an external connecting terminal configured to be electrically connected to a connecting terminal of an external device in the master mode and a connecting terminal of a setting information output device in the slave mode;
a command input circuit circuit configured to connect to the external connection terminal to receive a command signal from the external device via the external connecting terminal;
memory configured to store setting information related to operation of the detection unit;
a setting information input circuit configured to connect to the external connecting terminal to receive setting formation from the setting, information output device;
a switch configured to enable and disable the command input circuit and the setting information input circuit:
a mode selector configured to switch the detection sensor between the master mode and the slave mode; and
a control unit configured:
receive a detection signal related to the physical value change from the detection unit:
control the switch to enable the setting information input circuit to receive the setting information from the setting information output device; and
store the received setting information in the memory.

13. The detection sensor according to claim 12, wherein the control unit controls the switch to enable the setting information input circuit for a prescribed time from when a power-supply is applied.

14. The detection sensor according to claim 12, further comprising a connector in which the external connecting terminal is provided and electrically connected to the connecting terminal of the setting information output device.

15. The detection sensor according to claim 12, further comprising an informing member, wherein
the control unit is further configured to determine whether the setting information input circuit has received the setting information from the setting information output device, and
the informing member indicates that the setting information input circuit has received the setting information if the reception of the setting information is determined by the control unit.

16. The detection sensor according to claim 12, further comprising an informing member, wherein
the control unit is further configured to determine whether the setting information input circuit has received the setting information from the setting information output device in a normal manner, and
the informing member indicates a result of the determination performed by the control unit.

17. A detection method for a detection sensor to operate in a master mode or a slave mode, the detection method comprising:
detecting, using a detection unit, a physical value change in a detection area;
outputting, using an output circuit, an output signal related to the physical value change detected;
electrically connecting, using an external connecting terminal, to a connecting terminal of an external device in the master mode and to a connecting terminal of a setting information output device in the slave mode, the external connecting terminal being connected to the output circuit to transmit the output signal from the output circuit to the external device;
connecting, using an input circuit, to the external connecting terminal to receive first setting information from the setting information output device;
storing, using a memory, the first setting information and a second setting information related to operation of the detection unit;
enabling and disabling, using a switch, the output circuit and the input circuit;
switching, using a mode selector, the detection sensor between the master mode and the slave mode; and
using a control unit 1) receiving a detection signal related to the physical value change detected; 2) controlling the switch to enable the output circuit to output the second setting information to the external device in the master mode; 3) controlling the switch to enable the input circuit to receive the first setting information from the setting information output device in the slave mode; and 4) storing the received first setting information in the memory.

18. A detection method for a detection sensor to operate in a master mode or a slave mode, the detection method comprising:

detecting, using a detecting unit, a physical value change in a detection area;

electrically connecting, using an external connecting terminal, to a connecting terminal of an external device in the master mode and to a connecting terminal of a setting information output device in the slave mode;

receiving, using a command input circuit connected to the external connection terminal, a command signal from the external device via the external connecting terminal;

storing, using a memory, setting information related to operation of the detection unit;

receiving, using a setting information input circuit connected to the external connecting terminal, setting information from the setting information output device;

enabling and disabling, using a switch, the command input circuit and the setting information input circuit;

switching, using a mode selector, the detection sensor between the master mode and the slave mode; and using a control unit 1) receiving a detection signal related to the physical value change detected; 2) controlling the switch to enable the setting information input circuit to receive the setting information from the setting information output device; and 3) storing the received setting information in the memory.

* * * * *